(12) United States Patent
Schierl et al.

(10) Patent No.: US 12,495,150 B2
(45) Date of Patent: Dec. 9, 2025

(54) SCALABLE DATA STREAM AND NETWORK ENTITY

(71) Applicant: Dolby Video Compression, LLC, Wilmington, DE (US)

(72) Inventors: Thomas Schierl, Berlin (DE); Valeri George, Berlin (DE); Anastasia Henkel, Berlin (DE); Detlev Marpe, Berlin (DE); Karsten Grüneberg, Berlin (DE); Robert Skupin, Berlin (DE)

(73) Assignee: Dolby Video Compression, LLC, San Francisco, CA (US)

( * ) Notice: Subject to any disclaimer, the term of this patent is extended or adjusted under 35 U.S.C. 154(b) by 0 days.

(21) Appl. No.: 18/411,715

(22) Filed: Jan. 12, 2024

(65) Prior Publication Data
US 2024/0155141 A1 May 9, 2024

Related U.S. Application Data

(63) Continuation of application No. 17/587,849, filed on Jan. 28, 2022, now Pat. No. 11,876,985, which is a
(Continued)

(51) Int. Cl.
*H04N 19/169* (2014.01)
*H04N 19/13* (2014.01)
(Continued)

(52) U.S. Cl.
CPC ........... *H04N 19/188* (2014.11); *H04N 19/13* (2014.11); *H04N 19/174* (2014.11);
(Continued)

(58) Field of Classification Search
CPC ...... H04N 19/188; H04N 19/91; H04N 19/46; H04N 19/13; H04N 19/436; H04N 19/174;
(Continued)

(56) References Cited

U.S. PATENT DOCUMENTS 5,020,121 A 5/1991 Rosenberg
5,646,578 A 7/1997 Loh et al.
(Continued)

FOREIGN PATENT DOCUMENTS

AP 2010-232720 A 10/2010
AU 2012202123 A1 5/2012
(Continued)

OTHER PUBLICATIONS

Notice of Issuance issued Aug. 28, 2020 in Chinese Application 201810340437.8.
(Continued)

*Primary Examiner* — Jared Walker
(74) *Attorney, Agent, or Firm* — Morgan, Lewis & Bockius LLP

(57) ABSTRACT

The handling of scalable data streams by network entities is rendered less complex by, in the data stream, accompanying packets which actually carry data by packets of a different packet type which have a scalability axes descriptor defining the number of scalability axes and a semantic meaning thereof. In another aspect, the handling of scalable data streams by network entities is rendered more efficient by conveying level and/or profile descriptors using packets other than the data carrying packets, with profile and/or level descriptors being divided up into a first set explicitly signaling the definition of the available coding option set and/or available syntax element value range for a respective operation point, and a second set of profile and/or level descriptors which signal the definition of the available coding option set and/or available syntax element value range for their respective operation points by reference another profile and/or level descriptor.

15 Claims, 17 Drawing Sheets

Related U.S. Application Data continuation of application No. 15/930,937, filed on May 13, 2020, now Pat. No. 11,259,034, which is a continuation of application No. 16/025,319, filed on Jul. 2, 2018, now Pat. No. 10,694,198, which is a continuation of application No. 14/510,264, filed on Oct. 9, 2014, now Pat. No. 10,045,017, which is a continuation of application No. PCT/EP2013/057803, filed on Apr. 15, 2013.

(60) Provisional application No. 61/666,185, filed on Jun. 29, 2012, provisional application No. 61/624,098, filed on Apr. 13, 2012.

(51) Int. Cl.
| | |
|---|---|
| *H04N 19/174* | (2014.01) |
| *H04N 19/436* | (2014.01) |
| *H04N 19/46* | (2014.01) |
| *H04N 19/463* | (2014.01) |
| *H04N 19/593* | (2014.01) |
| *H04N 19/70* | (2014.01) |
| *H04N 19/91* | (2014.01) |

(52) U.S. Cl.
CPC ........... *H04N 19/436* (2014.11); *H04N 19/46* (2014.11); *H04N 19/463* (2014.11); *H04N 19/70* (2014.11); *H04N 19/91* (2014.11); *H04N 19/593* (2014.11)

(58) Field of Classification Search
CPC .... H04N 19/463; H04N 19/70; H04N 19/593; H04N 21/234; H04N 19/503; H04N 19/98; H04N 19/61; H04N 19/172
See application file for complete search history.

(56) References Cited

U.S. PATENT DOCUMENTS

| | | | |
|---|---|---|---|
| 5,736,947 | A | 4/1998 | Imanaka |
| 5,786,858 | A | 7/1998 | Yagasaki et al. |
| 6,025,932 | A | 2/2000 | Imanaka |
| 6,111,916 | A | 8/2000 | Talluri et al. |
| 6,580,754 | B1 | 6/2003 | Wan et al. |
| 6,646,578 | B1 | 11/2003 | Au |
| 6,894,628 | B2 | 5/2005 | Marpe et al. |
| 7,093,028 | B1 | 8/2006 | Shao et al. |
| 7,305,036 | B2 | 12/2007 | MacInnis et al. |
| 7,308,099 | B1 | 12/2007 | Allamanche et al. |
| 7,440,626 | B2 | 10/2008 | Kong et al. |
| 7,522,935 | B2 | 4/2009 | Rey et al. |
| 7,675,549 | B1 | 3/2010 | Brower et al. |
| 7,738,560 | B2 | 6/2010 | Gordon et al. |
| 7,782,947 | B2 | 8/2010 | Jeon et al. |
| 7,884,743 | B2 | 2/2011 | Sakaguchi et al. |
| 8,031,778 | B2 | 10/2011 | Kusakabe |
| 8,345,767 | B2 | 1/2013 | Nanbu et al. |
| 8,548,064 | B2 | 10/2013 | Kitahara et al. |
| 8,604,951 | B2 | 12/2013 | Sze et al. |
| 8,670,486 | B2 | 3/2014 | Hannuksela |
| 8,831,095 | B2 | 9/2014 | Koto et al. |
| 8,848,789 | B2 | 9/2014 | Bao |
| 8,885,731 | B2 | 11/2014 | Toma et al. |
| 8,930,562 | B2 | 1/2015 | Chen et al. |
| 9,131,033 | B2 | 9/2015 | Chen et al. |
| 9,185,439 | B2 | 11/2015 | Chen et al. |
| 9,215,473 | B2 | 12/2015 | Coban et al. |
| 9,560,380 | B2 | 1/2017 | Henry et al. |
| 2003/0072555 | A1 | 4/2003 | Yap et al. |
| 2004/0175047 | A1 | 9/2004 | Gormish et al. |
| 2004/0223551 | A1 | 11/2004 | Hannuksela |
| 2006/0120463 | A1 | 6/2006 | Wang |
| 2006/0120610 | A1 | 6/2006 | Kong et al. |
| 2006/0256851 | A1 | 11/2006 | Wang et al. |
| 2006/0268859 | A1 | 11/2006 | Smith |
| 2006/0270426 | A1 | 11/2006 | Marinier et al. |
| 2007/0022215 | A1 | 1/2007 | Singer et al. |
| 2007/0255846 | A1 | 11/2007 | Wee et al. |
| 2008/0002767 | A1 | 1/2008 | Schwarz et al. |
| 2008/0013620 | A1 | 1/2008 | Hannuksela et al. |
| 2008/0013622 | A1 | 1/2008 | Bao et al. |
| 2008/0013633 | A1 | 1/2008 | Ye et al. |
| 2008/0031346 | A1 | 2/2008 | Segall |
| 2008/0137731 | A1 | 6/2008 | Sekiguchi et al. |
| 2008/0143710 | A1 | 6/2008 | Lee et al. |
| 2008/0240244 | A1 | 10/2008 | Kitada et al. |
| 2008/0247459 | A1 | 10/2008 | Hu |
| 2008/0247460 | A1 | 10/2008 | Kang et al. |
| 2008/0285657 | A1 | 11/2008 | Fu et al. |
| 2008/0288441 | A1 | 11/2008 | Lee et al. |
| 2008/0292003 | A1 | 11/2008 | Wang et al. |
| 2009/0002379 | A1 | 1/2009 | Baeza et al. |
| 2009/0010337 | A1 | 1/2009 | Wang |
| 2009/0010338 | A1 | 1/2009 | Wang |
| 2009/0022219 | A1 | 1/2009 | Goel |
| 2009/0028247 | A1 | 1/2009 | Suh et al. |
| 2009/0037959 | A1 | 2/2009 | Suh et al. |
| 2009/0097704 | A1 | 4/2009 | Savidge et al. |
| 2009/0119730 | A1 | 5/2009 | Perlman et al. |
| 2009/0122865 | A1 | 5/2009 | Henocq et al. |
| 2009/0141809 | A1 | 6/2009 | Visharam et al. |
| 2009/0175349 | A1 | 7/2009 | Ye et al. |
| 2009/0213938 | A1 | 8/2009 | Lee et al. |
| 2009/0224950 | A1 | 9/2009 | Xu |
| 2009/0279604 | A1 | 11/2009 | Chono et al. |
| 2009/0323809 | A1 | 12/2009 | Raveendran |
| 2010/0014590 | A1 | 1/2010 | Smith |
| 2010/0026882 | A1 | 2/2010 | Jeon et al. |
| 2010/0091837 | A1 | 4/2010 | Zhu et al. |
| 2010/0098155 | A1 | 4/2010 | Demircin et al. |
| 2010/0098163 | A1 | 4/2010 | Chiu et al. |
| 2010/0135416 | A1 | 6/2010 | Huang et al. |
| 2010/0153395 | A1* | 6/2010 | Hannuksela ..... H04N 21/85406 707/E17.089 |
| 2010/0158099 | A1 | 6/2010 | Kalva et al. |
| 2010/0189182 | A1 | 7/2010 | Hannuksela |
| 2010/0205514 | A1 | 8/2010 | Henocq |
| 2010/0208735 | A1 | 8/2010 | Wiegand |
| 2010/0238994 | A1 | 9/2010 | Cakareski et al. |
| 2010/0238998 | A1 | 9/2010 | Nanbu et al. |
| 2010/0246662 | A1 | 9/2010 | Koto et al. |
| 2010/0246683 | A1 | 9/2010 | Webb et al. |
| 2010/0254620 | A1 | 10/2010 | Iwahashi et al. |
| 2010/0284460 | A1 | 11/2010 | Tsai et al. |
| 2010/0296428 | A1 | 11/2010 | Ho |
| 2010/0322317 | A1 | 12/2010 | Yoshimatsu et al. |
| 2011/0032999 | A1* | 2/2011 | Chen ................ H04N 21/2365 375/E7.021 |
| 2011/0069153 | A1 | 3/2011 | Nakane |
| 2011/0087487 | A1 | 4/2011 | Neuman |
| 2011/0116542 | A1 | 5/2011 | Oger et al. |
| 2011/0116552 | A1 | 5/2011 | Mito et al. |
| 2011/0188572 | A1 | 8/2011 | Min et al. |
| 2011/0200104 | A1 | 8/2011 | Korodi et al. |
| 2011/0228858 | A1 | 9/2011 | Budagavi et al. |
| 2011/0280314 | A1 | 11/2011 | Sankaren et al. |
| 2011/0317543 | A1 | 12/2011 | Medina et al. |
| 2011/0317769 | A1 | 12/2011 | Tanaka et al. |
| 2012/0008675 | A1 | 1/2012 | Karczewicz et al. |
| 2012/0014429 | A1 | 1/2012 | Zhao et al. |
| 2012/0014434 | A1 | 1/2012 | Hong et al. |
| 2012/0014451 | A1 | 1/2012 | Lee et al. |
| 2012/0014454 | A1 | 1/2012 | Budagavi et al. |
| 2012/0027316 | A1 | 2/2012 | Wang et al. |
| 2012/0036544 | A1 | 2/2012 | Chen et al. |
| 2012/0044987 | A1 | 2/2012 | Bennett |
| 2012/0081241 | A1 | 4/2012 | Misra et al. |
| 2012/0082218 | A1 | 4/2012 | Misra et al. |
| 2012/0082232 | A1 | 4/2012 | Sole Rojals et al. |
| 2012/0082235 | A1 | 4/2012 | Lou et al. |
| 2012/0086587 | A1 | 4/2012 | Sze et al. |
| 2012/0163457 | A1 | 6/2012 | Wahadaniah et al. |
| 2012/0189049 | A1 | 7/2012 | Coban et al. |

(56) References Cited

U.S. PATENT DOCUMENTS

| | | |
|---|---|---|
| 2012/0201306 A1 | 8/2012 | Kang et al. |
| 2012/0230428 A1 | 9/2012 | Segall et al. |
| 2012/0328003 A1 | 12/2012 | Chien et al. |
| 2012/0328004 A1 | 12/2012 | Coban et al. |
| 2013/0016786 A1 | 1/2013 | Segall |
| 2013/0034171 A1 | 2/2013 | Winken et al. |
| 2013/0107952 A1 | 5/2013 | Coban et al. |
| 2013/0202050 A1 | 8/2013 | Koto et al. |
| 2013/0279600 A1 | 10/2013 | Toma et al. |
| 2013/0294506 A1 | 11/2013 | Kang et al. |
| 2014/0161190 A1 | 6/2014 | Park et al. |
| 2014/0205008 A1 | 7/2014 | Wu |
| 2014/0341549 A1 | 11/2014 | Hattori |
| 2015/0208095 A1 | 7/2015 | Schierl et al. |
| 2018/0220161 A1 | 8/2018 | Schierl et al. |
| 2023/0188738 A1 | 6/2023 | Nalci et al. |

FOREIGN PATENT DOCUMENTS

| | | |
|---|---|---|
| CA | 2 644 753 A1 | 9/2007 |
| CA | 2870989 A1 | 10/2013 |
| CN | 1349719 A | 5/2002 |
| CN | 1620820 A | 5/2005 |
| CN | 1691130 A | 11/2005 |
| CN | 1526238 A | 7/2006 |
| CN | 101014082 A | 8/2007 |
| CN | 101110958 A | 1/2008 |
| CN | 101150719 A | 3/2008 |
| CN | 10128831 A | 7/2008 |
| CN | 101217654 A | 7/2008 |
| CN | 101217661 A | 7/2008 |
| CN | 101218827 A | 7/2008 |
| CN | 101283351 A | 10/2008 |
| CN | 101283599 A | 10/2008 |
| CN | 101313578 A | 11/2008 |
| CN | 101320371 A | 12/2008 |
| CN | 151785 | 4/2009 |
| CN | 101427573 A | 5/2009 |
| CN | 101444102 A | 5/2009 |
| CN | 101453639 A | 6/2009 |
| CN | 101491097 A | 7/2009 |
| CN | 101507281 A | 8/2009 |
| CN | 101536527 A | 9/2009 |
| CN | 101553988 A | 10/2009 |
| CN | 101568037 A | 10/2009 |
| CN | 101578884 A | 11/2009 |
| CN | 101601305 A | 12/2009 |
| CN | 101658038 A | 2/2010 |
| CN | 101663893 A | 3/2010 |
| CN | 101677430 A | 3/2010 |
| CN | 101690228 A | 3/2010 |
| CN | 101842988 A | 9/2010 |
| CN | 101878649 A | 11/2010 |
| CN | 101889442 A | 11/2010 |
| CN | 101902299 A | 12/2010 |
| CN | 101904168 A | 12/2010 |
| CN | 101939994 A | 1/2011 |
| CN | 101960853 A | 1/2011 |
| CN | 101971630 A | 2/2011 |
| CN | 102137298 A | 7/2011 |
| CN | 102208110 A | 10/2011 |
| CN | 10247655 A | 5/2012 |
| CN | 102447673 A | 5/2012 |
| EP | 1 482 669 A1 | 12/2004 |
| EP | 1667460 A2 | 6/2006 |
| EP | 2136563 A2 | 12/2009 |
| EP | 101552924 A2 | 12/2009 |
| EP | 3 481 068 A1 | 5/2019 |
| EP | 3 793 200 B1 | 11/2022 |
| EP | 4 192 012 B1 | 7/2024 |
| GB | 2360163 A | 9/2001 |
| GB | 2 491 164 A | 11/2012 |
| JP | H09-298668 A | 11/1997 |
| JP | 3133403 B2 | 2/2001 |
| JP | 3409552 B2 | 5/2003 |
| JP | 2004-349820 A | 12/2004 |
| JP | 2005-347780 A | 12/2005 |
| JP | 2006180521 A | 7/2006 |
| JP | 2007-535208 A | 11/2007 |
| JP | 2008017331 A | 1/2008 |
| JP | 2009510888 A | 3/2009 |
| JP | 2009177787 A | 8/2009 |
| JP | 2010516085 A | 5/2010 |
| JP | 2010-130402 A | 6/2010 |
| JP | 2010174497 A | 8/2010 |
| JP | 2010-532121 A | 9/2010 |
| JP | 2010-232720 A | 10/2010 |
| JP | 2011-217082 A | 10/2011 |
| JP | 2011-223358 A | 11/2011 |
| JP | 2013132048 A | 7/2013 |
| JP | 2013535886 A | 9/2013 |
| JP | 2013535900 A | 9/2013 |
| JP | 2013536623 A | 9/2013 |
| JP | 7140870 B2 | 9/2022 |
| KR | 10-2008-0001156 A | 1/2008 |
| KR | 10-2010-0038490 A | 4/2010 |
| KR | 10-2010-0046156 A | 5/2010 |
| KR | 101858200 B1 | 5/2018 |
| RU | 2093968 C1 | 10/1997 |
| RU | 2406258 C2 | 9/2007 |
| RU | 2374786 C1 | 11/2009 |
| RU | 2375839 C2 | 12/2009 |
| RU | 2 384 970 C1 | 3/2010 |
| RU | 2 407 219 C2 | 8/2010 |
| TW | 488155 B | 5/2002 |
| TW | 527798 B | 4/2003 |
| TW | 200926654 A | 6/2009 |
| TW | 201105112 A1 | 2/2011 |
| VN | 1000843 B | 6/2010 |
| VN | 10008434 B | 6/2010 |
| WO | 1997005747 A1 | 2/1997 |
| WO | 2001080570 A2 | 10/2001 |
| WO | 2003043345 A1 | 5/2003 |
| WO | 2005/071970 A1 | 8/2005 |
| WO | 2006/109974 A1 | 10/2006 |
| WO | 2010050157 A1 | 5/2010 |
| WO | 2011038021 A1 | 3/2011 |
| WO | 2011/048303 A1 | 4/2011 |
| WO | 2011100456 A1 | 8/2011 |
| WO | 2012009566 A2 | 1/2012 |
| WO | 2012033673 A1 | 3/2012 |
| WO | 2012045037 A2 | 4/2012 |
| WO | 2012121420 A1 | 9/2012 |
| WO | 2013063094 A1 | 5/2013 |
| WO | 2013063425 A | 5/2013 |
| WO | 2013077236 A1 | 5/2013 |
| WO | 2013151634 A1 | 10/2013 |
| WO | 2013161203 A1 | 10/2013 |

OTHER PUBLICATIONS

Office Action issued Jul. 6, 2020 in Brazilian Application 112014025496-6.

Notice of Acceptance issued Sep. 10, 2020 in Australian Application 2018236689.

Gordan Clare et al.; "AHG 4: Picture Raster Scan Decoding in the presence of multiple tiles"; JCT-VC of ITU-T SG 16 WP 3 and ISO/IEC JTC 1/SC 29/WG11, JCTVC-I0158, 9th Meeting: Geneva, CH, Apr. 27-May 7, 2012.

Notice Before Hearing issued Sep. 23, 2020 in Israeli Application 277485.

Decision to Grant issued in responding Japanese Patent Application No. 2019-186497 dated Jan. 4, 2022.

Office Action issued in corresponding Korean Patent Application No. 10-2021-7037683 dated Jan. 7, 2022, with English translation.

Office Action issued in corresponding Chinese Patent Application No. 201910661351X dated Jan. 20, 2022, with English translation.

Extended European Search Report issued in corresponding European Patent Application No. 21 166 059.2-1208 dated Oct. 5, 2021.

Sullivan, G. et al., "Meeting report of the 10th meeting of the Joint Collaborative Team on Video COding (JCT-VC)", 10 Meeting, Stockholm, Jul. 11-20, 2012, Document JCTVC-J_Notes_dB.

(56) References Cited

OTHER PUBLICATIONS

Kanumuri, S., el al., "AHG 4: Category-prefixed data batching for tiles and wavefronts". 9. Meeting, Geneva, Apr. 27-May 7, 2012, Document JCTV-10427.
Hendry, H., et al., "AHG 4: Unified marker for Tiles' and WPP's entry points", 9. JCT-VC Meeting, Geneva, Apr. 27-May 7, 2012, Document JCTVC-I0080.
Fuldseth, A. et al., "Tiles for Managing Computational Complexly of Video Encoding and Decoding Picture Coding Symposium", Krakow, May 7-9, 2012.
Certified Copy of Prioriy Document U.S. Appl. No. 61/866,185, filed Jun. 9, 2012.
Hannuksela, M.M., et al., "Nested hierarchy of tiles and slices through slice header prediction", 9. JCT-VC Meeting, Geneva, Apr. 27-May 7, 2012, D0aJ1T1ent JCTVC-l0070.
De Schrijver, D. et al., "Exploitation of Interactive Region of Interest Scalability in Scalable Video Coding by Using an XML-driven Adaptation Framework", Proceedings of the 2nd International Conference on Automated production of Cross Media Content for Multi-Channel distribution, Leeds., Dec. 13-15, 2006.
Office Action issued in corresponding Indian Patent Application No. 202038001779 dated Nov. 24, 2021, with English translation.
Office Action issued in corresponding Indian Patent Application No. 202038001780 dated Nov. 24, 2021, with English translation.
Notice of Eligibility for Grant issued in corresponding Singapore Patent Application No. 10201702988R dated Nov. 8, 2021, with English translation.
Office Action issued in corresponding Ukrainian Patent Application No. a 2017 02384 dated Nov. 24, 2021, with English translation.
Chi, Ching Chi et al., Parallel HEVC; Decoding on Multi- and Many-core Architectures. Journal of Signal Processing; Systems. 71 (3). Jun. 2012. pp. 1-14.
Hearing Notice issued in corresponding Indian Patent Application No. 3035/KOLNP/2014 issued Dec. 15, 2021.
Office Action issued in corresponding Mexican Patent Application No. MX/a/2016/016671 issued Dec. 16, 2021, with English translation.
Office Action issued in corresponding Russian Patent Application No. 2020114791 issued Dec. 10, 2021, with English translation.
Notice of Opposition issued in corresponding European Patent Application No. 16200327.1 dated Oct. 7, 2021.
Office Action (Decision to Grant) issued in corresponding Russian Patent Application No. 2019141081 dated Aug. 17. 2021, with English translation.
Office Action issued in corresponding Malaysian Patent Application No. PI 2018000040 dated Aug. 19, 2021.
Office Action (Notice of Allowance) issued in corresponding Korean Patent Application No. 10-2020-7030444 dated Aug. 20, 2021, will English translation.
Final Office Action Issued In corresponding U.S. Appl. No. 16/514,052 dated Jul. 7, 2021.
Office Action issued in corresponding Chinese Patent Application No. 2019108763916 dated Jul. 2, 2021, with English translation.
Office Action issue in corresponding Chinese Patent Application No. 201910661351X dated Apr. 2, 2021, with English translation.
Office Action issue in corresponding Israeli Patent Application No. 277 485 dated Feb. 15., 2021.
Office Action issue in corresponding Japanese Patent Application No. 2019-132737 dated Feb. 25, 2021, with English translation.
Hendry et at, AHG4: Harmonized Method for Signalling Entry Points of tiles and WPP Substreams, Joint Collaborative Team on Video Coding (JCT-VC) of ITU-T SG16 WP3 and ISO/IEC JTC1/SC29/WG11, 8th Meeting: San Jose, CA, USA, Feb. 2012, JCTVC-H0566 (JCTVC-H0556_r1.docx), pp. 1-7.
Office Action issue in corresponding Russian Patent Application No. 2019141081 dated Mar. 29, 2021, with English translation.
T. Lee et al. "Simplificalon on tiles and slices", JCTVC-H0348 (version 3), publ. Feb. 1, 2012 on 10 pages [revealed Mar. 29, 2021], revealed in Internet at URL:http://phenix.itsudparis.eu/jct/doc_end_user/current_document .php?id=4651 1-24.

Office Action issue in Corresponding Ukrainian Patent Application No. a 2017 02253 dated Mar. 25, 2021, with English translation.
Office Action issued in corresponding Korean Patent Application No. 10-2020-7027741 issued Nov. 26, 2020. with English translation.
International Telecommunication Union (ITU-1) Recommendation H.264, "Advanced video coding for generic Audiovisual services", Mar. 2005, pp. 1-321.
T. Schierl et al., "Dependent Slices", Joint Collaborative Team on Video Coding (JCT-VC) of ITU-T SG 16 WP 3 and IS0/IEC JTC 1/SC 29JWG 11. 9th Meeting: Geneva, CH, Apr. 27-May 7, 2012, pp. 1-6.
Kimihiko Kazui et al., "AHG9: Improvement of HRD for sub-picture 11ased operation", Joint Collaborative Team on Video Coding (JCT-VC) Of ITTJ-T SG 18 WP 3 and ISO/IEC JTC 1/SC 29/WG 11, 10lh Meeting: Stockholm, SE, JTCVC-1J0136.2012/ 7,pp. 1-10.
T. Schierl et al .• Slice Prefix for sub-picture and slice level HLS signalling, Joint Collaborative Team on Video Coding (JCTVC) of ITU-T SG 16 WP 3 and ISO/IECJTC 1/SC 29/WG 11, 10th Meeting: Stockholm, SE, Jul. 2012, JCTVC-J0255, pp. 1-12.
Office Action issued in corresponding Japanese Patent Applcation No. 2019-186497 dated Nov. 24, 2020, with English translation.
Decision to Grant issued in corresponding AJapanesePatent Application No. 2020-002001 mailed Jan. 5, 2021, with English translation.
Benjamin Bross et al., "High efficiency video coding (HEVC) text specification draft 6", Joint Collaboralive Team on Video Coding (JCTVC) of ITU-T SG16 WP3 and ISO/IEC JTC1/SC29JWG11, 8th Meeting: San Jose, CA, USA, Feb. 1-10, 2012, pp.
Notice of Acceptance for patent application issued in corresponding Australian Patent Application No. 2019202551, dated Dec. 7, 2020.
Office Action issued in corresponding Israeli Patent Application No. 283196 dated Apr. 4, 2022.
Office Action (Notice of Issuance) issued in corresponding Israeli Patent Application No. 268801 dated May 17, 2022.
Office Action (Notice of Issuance) issued in corresponding Chinese Patent Application No. 201910661351X dated May 20, .2022.
Office Action issued in corresponding Russian Patent Application No. 2021129916 dated May 13, 2022, with English translation.
Boyce, J., et al., "High level syntax hooks for future extensions", 8th JCT-VC Meeting, ITU-T SG16 WP3 and 1S0/IEC JTC1/SC29/ WG11, Document: JCTVC-H0388, Feb. 1-10, 2012, 8 pages.
Bross, B. et al., "High Efficiency Video Coding (HEVC) Text Specification Draft 7", 9th JCT-VC Meeting, ITU-T SG16 WP3 and ISO/IEC JTC1/SC29/WG11, Document: JCTVC-11003 d0, Apr. 27· May 7, 2012, 268 pages.
Bross, B. et al., "High efficiency video coding (HEVC) text specification draft 6", 8th JCT-VC Meeting, ITU-T SG 16 WP3 and 1SO/IEC JTC1/SC29/WG11, Document: JCTV.H1003,Feb. 1-10, 2012, 259 pages.
Bross, Benjamin et al., "High efficiency video coding (HEVC) text specification draft 7, [online], Jun. 12, 2012, Joint Collaborative Team in Video Coding (JVT-VC) of ITU-T SG16 WP 3 and ISO/IECJTC1/SC29/WG11", Document: JCTVC-11003_d4, searched on Feb. 9, 2016, Internet <URL: http://phenix.it- sudparis.eu/jct/doc_end_user/documents/9_Geneva/wgll/JCTVC-11003-v5.zip, 297 pages.
Chen, Y., et al., "View scalability information SEI message for MVC", 23rd JVT Meeting, JVT-W037, 15O/IEC MPEG and ITU· T VCEG, (1SO/IEC JTC1/SC29/WG11 and ITU·T SG 16 Q.6), Document: JVT-W037, Apr. 21-27, 2007, 10 pages.
Clare, G., et.al., "Wavefront Parallel Processing for HEVC Encoding and Decoding", [online], Jul. 16, 2011, Joint Collaborative Team on Video Coding (JCT-VC) of ITU-T SG16 WP3 and 1SO/IEC JTC1/SC29/WG11, Document: JCTVC-F274 (version 2), Searched on Nov. 16, 2015, 21 pages.
Hao-Song Kong et al: "Fast region-of-interest transcoding for JPEG 2000 images," Circuits and Systems, 2005, ISCAS 2005, IEEE International Symposium on, May 23-26, 2005 (May 26, 2005), 6 pages.
Hendry Sangoh Jeong, et al., "AHG4: Harmonized Method for Signalling Entry Points of tiles and WPP Substreams", [online],

(56) References Cited

OTHER PUBLICATIONS

Feb. 10, 2011, Joint Collaborative Team on Video Coding (JCT-VC) of ITU-T SG16 WP3 and 1SO/IEC JTC1/SC29/WG11, Searched in Nov. 16, 2015, 12 pages.

ITU-T H.222.0, Series H: Audiovisual and Multimedia Systems, Infrastructure of Audiovisual Services-Transmission Multiplexing and Synchronization, Information Technology-Generic coding of Moving Pictures and Associated Audio Information: Systems, May 2012, 234 pages.

JCT-VC: "High-efficiency video coding text specification working draft 7," JCTVC-I1003 (May 10, 2012), 268 pages.

Kang, J.W., et al., Simple NAL Unit Header for HEVC, 8th JCT-VC Meeting, ITU-T SG16 WP3 and ISO/IEC JTC1/SC29/WG11, Document: JCTVC-H0410, Feb. 1-10, 2012, 6 pages.

Mauricio Alvarez-Mesa, et.al., "Parallel Video Decoding in the Emerging HEVC 131 Standard" Proceedings of 2012 IEEE Int. Conf. on Acoustics, Speech, and Signal Processing (ICASSP), Mar. 30, 2012, p. 1545-1548, ISBN:978-1-4673-0045-2; 4 pages.

Misra, K. et al., "Entropy Slices for Parallel Entropy Coding", 3rd JCT-VC Meeting, ITU-T 132 SG16 WP3 and 1SO/IEC JTC1/SC29/WG11, Document: JCTVC-C256, Oct. 7-15, 2010, pp. 1-6.

Office Action and Search Report dated Jan. 28, 2016, issued in parallel Russian Patent Application No. 2014145559, with English translation, 6 pages.

Office Action dated Apr. 4, 2016, issued in parallel Russian Patent Application No. 2015102812, with English translation, 11 pages.

Office Action dated Feb. 23, 2016, issued in parallel Japanese Patent Application No. 2015-519177, with English translation, 29 pages.

Office Action dated Feb. 9, 2016, issued in parallel Chilean Patent Application No. 2739-14, with partial English translation, 12 pages.

Office Action issued in parallel Japanese Patent Application No. 2015-504979, dated Nov. 17, 2015, with English translation, 26 pages.

Office Action, issued in parallel Korean Patent Application No. 10-2015-7002242, dated Jan. 20, 2016, with English translation, 25 pages.

Official Communication issued in corresponding International Application PCT/EP2013/063853, mailed on Nov. 25, 2013.

Official Communication issued in corresponding International Application PCT/EP2013/057803, mailed on Oct. 31, 2013.

Okubo, Sakae (Supervisor), Impress Standard Textbook Series, Modified 3rd ed. H.264/AVCTextbook, 1st ed., Jan. 1, 2009, Impress R&D, Corporation, pp. 99-107, 185-193, ISBN: 978-4-8843-2664-9, 27 pages.

Schierl, T. et al., "RTP Payload Format for High Efficiency Video Coding Draft-Schieri-Payload-rtp-h265-03.lxt", Network Working Group, Internet Draft, Intended Status: Standards Track, Jun. 11, 2013, pp. 1-69.

Schierl, T. et al., "Slice Prefix for Sub-Picture and Slice Level HLS Signalling", 10th Meeting, JCT-VC of ITU-T SG16 WP3 and 1SO/IEC JTC 1/SC 29/WG 11, JCTVC-J0255, Jul. 11-20, 2012, 12 pages.

Schierl, T. et al., Dependent Slices, online, Apr. 16, 2012, Joint Collaborative Team Video Coding (JCT-VC) of ITU-T SG 16 WP 3 and ISO/IC JTC 1/SC 29/WG 11, Document: JCTVC-10229, [Searched on Feb. 10, 2016], Internet <URL: http://phenix.it- sudparis.eu/jct/doc_end_user /documents/9_ Geneva/wgII/JCTVC-10229-vl.zip.

Schulzrinne, H. et al., •RTP: A Transport Protocol for Real-Time Applications, Network Working Group, Request for Comments: 3550, Obsoletes: 1889, Category: Standards Track, Jul. 2003, pp. 1-78.

Series H: Audiovisual and Multimedia Systems, Infrastructure of Audiovisual Services—Transmission Multiplexing and Synchronization, "Information Technology-Generic Coding of Moving Pictures and Associated Audio Information: Systems", International Standard ISO/IEC 13818-1, ITU-T Recommendation H.222.0, 2012,234 pages.

Skupin, R., et al. "Generic HEVC high level syntax for scalability and adaptation" JOVC-10217, 9th JCT-VC Meeting, ITU-T SG16 WP3 and 1SO/IEC JTC1/SC29/WG11, Document: JCTVC-10217, Apr. 27-May 7, 2012, 6 pages.

Tammy Lee, et.al., "Simplification on tiles and slices", [online], Feb. 1, 2011, Joint Collaborative Team on Video Coding (JCT-Ve) of ITU-T SG16 WP3 and ISO/IEC JTC1/SC29/WG11, Document: JCTVC-H0348 (verison 3), [Searched on Nov. 16, 2015], 15 pages.

Wang, Y. et al., "RTP Payload Format for H.264 Video", Internet Engineering Task Force 6184, May 2011, 101 pages.

Wang, Y. et al., "Sub-Picture Based CPB Operation", 9th JCT-VC Meeting, ITU-T SG16 WP3 and 1SO/IEC JTC1/SC29/WG11, Document: JCTVC-10588, Apr. 27-May 7, 2012, pp. 1-2.

Wang, Y. K., et al., "On SVC scalability information related SEI messages", JVT•W051, 23rd JVT-VC, 1SO/IEC MPEG and ITU-TVCEG, (ISO/IECJTC1/SC29/WG11 and ITU-T SG 16 Q.6), Document: JVT-WOSI,Apr. 21-27, 2007, 14 pages.

Wang, Y.K., et al. "Sub-picture-level low-delay CPB behavior" JCTVC-10349, publ., May 4, 2010 on 30 pages [found Mar. 25, 2016], found in the Internet URL:http:/phenix.it-sudparis.eu/jct/doc_end_user/current_document.php?id=5607 text of the article is found at address URL: http://phenix.it- sudparis.eu/jct/doc_end_user/documents/9_Geneva/wg11/JCTVC-10349-vl.zip, sections "Abstract", "1.1 Video applications and end-to-end delay", "1.2 Hypothetical reference decoder; (HRD)", "1.3 Sub-picture based coded picture buffer (CPB) behavior" and "2 Proposal", 19 pages.

Wenger, S. et al., "RTP Payload Format for Scalable Video Coding", Internet Engineering Task Force 6190, May 2011, 100 pages.

Wiegand, T. et al., "Overview of the H.264/AVC Video Coding Standard", IEEE Transactions on Circuits and Systems for Video Technology, vol. 13, No. 7, Jul. 2003, 19 pages.

Xun Guo, et.al., "Ordered Entropy Slices for Parallel CABAC", [online], May 2, 2009, ITU-Telecommunications Standardization Sector Study Group 16 Question 6, Document: VCEG-AK25 (Filename:VCEG-AK25_r1.doc) [Searched on Nov. 16, 2015], 11 pages.

Y-K Wang et al: "Sub-picture based CPB, operation," 9. JCT-VC Meeting; 100, MPEG Meeting; Apr. 27, 2012-May 7, 2012; Geneva; JCIVC-10588 (May 3, 2012), 2 pages.

European Search Report issued in European Application 16200327.1, dated Feb. 6, 2017.

Wang, Ye-Kui et al: "AHG4: Tile groups", 7. JCT-VC Meeting; 98. MPEG Meeting; Nov. 21, 2011-Nov. 30, 2011; Geneva; (Joint Collaborative Team on Video Coding of ISO/IECJTC1/SC29/WG11AND ITU-TSG.16 ); URL: http ://wftp3 itu.int/av- rch/jctvc-site/, No. JCTVC-G318, Nov. 9, 2011 (Nov. 9, 2011), XP030110302.

Lambert P et al: "11 Flexible macroblock ordering in H.264/AVC", Journal of Visual Communication and Image Representation, Academic Press, Inc, US, vol. 17, No. 2, Apr. 1, 2006 (Apr. 1, 2006), pp. 358-375, XP024905097, ISSN: 1047-3203, DOI: 10.1016/JJVCI R .2005.05.008.

Fuldseth (Cisco) A.: "Replacing slices with tiles for high level parallelism", JCT-VC Meeting; 95. MPEG Meeting; Jan. 20, 2011-Jan. 28, 2011; Daegu; (Joint Collaborative Team on Video Coding of 1SO/IEC JTC1/SC29/WG11AND ITU-T SG.16); URL: http://wftp3.itu.int/av-arch/jctvc-site/, No. JCTVC-0227, Jan. 15, 2011(Jan. 15, 2011), XP030008267, ISSN: 0000-0013.

Office Action issued in Korean Application 10-2016-7034316 dated Jan. 4, 2017.

Bross, Benjamin et al., "High efficiency video coding (HEVC) text specification draft 6", (JCTVC-H1003_dj), JCT-VC of ITU-T SG16 WP3 and 1SO/IEC JTC1/SC29/WG11, 7th Meeting: Geneva, CH, Feb. 17, 2012.

Office Action issued Jan. 5, 2017 in U.S. Appl. No. 14/578,814.

Notice of Allowance issued Feb. 24, 2017 in Taiwanese Patent Application No. 105130457.

Office Action issued Mar. 16, 2017 in European Patent Application No. 16206334.1.

Cohan M. et al., "AHG4: Unification of picture partitioning schemes", 7. JCT-VC Meeting, 98. M PEG Meeting, Geneva, Nov. 2011 (Joint Collaborative Team on Video Coding of 1SO/IEC JTC1/SC29/WG11 and ITU-T SG.16), URL: http://wftp3 itu.int/av-arch/j ctvc-site/, No. JCTVC-6315, XP030110299.

(56) References Cited

OTHER PUBLICATIONS

Ching Chi C. et al., HA QHD-capable parallel H.264 decoder, Supercomputing, ACM, New York, May 2011, pp. 317-326, XP058003741, DOI: 10.1145/1995896.1995945, ISBN: 978-1-4503-0102-.
Gordon c. et al., Wavefront Parallel Processing for HEVC Encoding and Decoding», 6. JCT-VC Meeting, 97. MPEG Meeting, Torino, Jul. 2011 (Joint Collaborativem Team on Video Coding of 15O/IEC JTC1/SC29/WG11 and ITU-T SG.16), URL: http://wftp3.itu.int/av-arch/jctvc-site/, No. JCTVC-F274.
Decision to Grant dated Mar. 21, 2017 in Japanese Application 2015-504980.
Sullivan, G., et al., "Meeting report of the fifth meeting of the Joint Collaborative Team on Video Coding (JCT-VC), Geneva, CH, Mar. 16-23, 2011", 5th Meeting, Geneva, Mar. 16-23, 2011, Document JCTVC-E_Notes_d8m, 174 pages.
Misra, K., et al., "Tiles for parallel decoding", 5th Meeting, Geneva, Mar. 16-23, 2011, Document JCTVC-E412, 5 pages.
Decision to Grant Japanese Patent Application No. 2016-160844 dated Jun. 18, 2019.
Notification to Grant Chinese Patent Application No. 201380031293.3 dated Jul. 3, 2019.
Notice of Allowance Philippines Patent Application No. 1/2017/501901 dated Jul. 3, 2019.
Notice of Allowance Philippines Patent Application No. 1/2017/501900 dated Jul. 3, 2019.
Office Action Korean Patent Application No. 10-2019-7014099 dated Jul. 3, 2019.
Office Action Korean Patent Application No. 10-2019-7014098 dated Jul. 3, 2019.
Office Action Korean Patent Application No. 10-2019-7014097 dated Jul. 3, 2019.
Office Action India Patent Application No. 3035/KOLNP/2014 dated Jul. 16, 2019.
Sullivan et al., "Meeting Report of the ninth meeting of the Joint Collaborative Team on Video Coding (JCT-VC)", Joint Collaborative Team on Video Coding (JCT-VC) of ITU-T SG16 WP3 and JTC1/SC29/WG119th Meeting: Geneva, CH, Apr. 27-May 7, 2012, pp. 1-239.
Office Action Taiwanese Patent Application No. 107125227 dated Jun. 28, 2019.
Office Action malled Aug. 14, 2019 In U.S. Appl. No. 16/514,052.
Notice of Allowance mailed Jul. 29, 2019 in Philippine Application 12017501899.
Office Action issued Aug. 22, 2019 in Israeli Application 268801.
Decision to Grant issued Sep. 10, 2019 in Japanese Application 2017-019896.
Office Action issued Sep. 10, 2019 in Korean Application 10-2018-7002787.
Office Action issued Sep. 11, 2019 in Australian Application 2018236689.
ITU-T H.222.0, Series H: Audiovisual and Multimedia Systems, Infrastructure of Audiovisual Services-Coding of Moving Video, Advanced Video Coding for Generic Audiovisual Services, Mar. 2005.
Schierl, T. et al., "Dependent Slices," Joint Collaborative Team on Video Coding (JCT-VC) of ITU-T SG 16 WP 3 and ISO/IECJTC 1/SC 29/WG11, 9th Meeting: Geneva, CH, Apr. 27-May 7, 2012.
Office Action issued Oct. 30, 2019 in U.S. Appl. No. 16/025,319.
Office Action issued Oct. 15, 2019 in Russian Patent Application 2016141337.
Decision to Grant issued Nov. 15, 2019 in Korean Application 10-2019-7014097.
Decision to Grant issued Nov. 15, 2019 in Korean Application 10.2019.7014098.
Office Action issued Nov. 26, 2019 in Mexican Application MX/a/2017/009967.
Notice of Allowance mailed Dec. 10, 2019 in U.S. Appl. No. 16/153,307.
Office Action issued Nov. 25, 2019 in Philippine Application 1-2019-501219.
Office Action issued Dec. 10, 2D19 in Australian Application 2019202551.
Notice of Allowance mailed Dec. 12, 2019 in U.S. Appl. No. 16/514,052.
Decision to Grant mailed Jan. 3, 2020 in Korean Application 10-2019-7014099.
Office Action issued Nov. 26, 2019 in Japanese Application 2018-207464.
Office Action issued Jan. 9, 2020 In Russian Application 2019141081.
Office Action issued Feb. 25, 2020 in Chinese Application 201810340437.8.
Decision to Grant issued Feb. 28, 2020 in Russian Application 2017137234.
Office Action issued Mar. 24, 2020 in Chinese Application 201810340438.2.
Office Action issued Mar. 24, 2020 in Chinese Application 201810340459.4.
Office Action issued Apr. 8, 2020 in Chinese Application 201810340463.0.
Office Action issued Apr. 8, 2020 in Korean Application 10-2020-7004531.
Office Action issued Apr. 21, 2020 in U.S. Appl. No. 16/819,652.
Office Action issued May 9, 2020 in Singapore Application 10201809547W.
Kazui Kimihiko, et al., "Enhancement on operation of coded picture buffer", Joint Collaborative Team on Video Coding JCT-VC) of ITU-T SG16 WP 3 and ISO/IEC JTC1/SC29/WG11, 7th Meeting: Geneva, CH, JCTVC-G188. Nov. 30, 2011.
Office Action mailed May 18, 2020 in U.S. Appl. No. 16/514,052.
Notice of Allowance malled May 27, 2020 In Canadian Application 2877045.
Office Action issued Jun. 28, 2020 in Korean Application 10-2018-7002787.
Notice of Allowance Issued Jun. 18, 2020 In Israel Application 261382.
Decision to Grant issued Jul. 22, 2020 in Korean Application 10-2020-7004531.
Office Action issued Jul. 13, 2020 in Mexican Application MX/a/2017/009967.
Office Action issued Jun. 23, 2020 in Japanese Application 2018-207464.
Notice of Allowance issued Jul. 20, 2020 in Taiwanese Application 107125227.
Office Action mailed Aug. 17, 2020 in U.S. Appl. No. 161819852.
Office Action issued Jul. 1, 2020 in Brazilian Application 1120140326878.
Office Action mailed Aug. 28, 2020 in U.S. Appl. No. 161514052.
Sakae Okubo, "Impress Standard Textbook Series, revision 3rd ed. H264/AVC Textbook", Japan, Impress R&D Co. Ltd., Jan. 1, 2009, 1st ed., p. 315-319, ISBN:978-4-8443-2664-9.
Sjoberg R. et al., "NAL unit header concept with support for bit stream scalability", [online], Joint Collaborative Team on Video Coding (JCT-VC) of ITU-T SG16 WP3 and ISO/IEC JTC1/SC29/WG11, Mar. 19, 2011, Document: JCTVC-E422, [Searched on Oct. 2, 20131, Internet <URL: http://phenix.itsudparis. eu/jct/doc end user/documents/5Geneva/wgl11JCTVC-E422-v2.zip>.
"H.264 (Jan. 2012)", [online], ITU-T, Jan. 13, 2012, p. 605, 606, 630-632, 646-649, [Searched on Aug. 12, 2-15], Internet <URL: https://www.itu.int/rec/dologin_pub.asp?lang=e&id=T-REC-.264-201201-S!!PDF-E&type=items>.
Sjoberg, R. et al., "High-Level Syntax for Bitstream Extraction", (online], Joint Collaborative Team on Video Coding (JCT-VC} of ITU-TSG16 WP3 and 1SO/IEC JTC1/SC29/WG11, Nov. 26, 2011, Document: JCTVC-G607, [Searched on Nov. 8, 2013], Internet <URL: http://phenix.it-sudparis.eu/jct/doc_end_user/documents/7_Geneva/wgl1/JCTVC-G607-v2.zip>.
Boyce, J. et al., "Information for scalable Extension highly layer syntax", [online], Joint Collaborative Team on Video Coding (JCT-VC) of ITU-T SG16 WP3 and ISO/IECJTC1/SC29/WG11, Jan. 25, 2012, Document: JCTVC-H0386, [Searched on Dec. 20, 2013],

(56) References Cited

OTHER PUBLICATIONS

Internet <URL: http://phenix.it-sudparis.eu/jct/doc_end_user/documents/8_San%20Jose/wg11/JCTVC-H0386-v3.zip>.
Office Action dated Mar. 24, 2017 in Chinese Application 201380031293.3.
Office Action dated Apr. 1, 2017 in Chinese Application 201380034944.4.
Office Action dated May 3, 2017 in Chinese Application 201380031308.6.
Office Action dated Jun. 22, 2017 in Australian Application 2016204304.
Schwarz et al.; "Overview of the Scalable Video Coding Extension of the H.264/AVC Standard"; IEEE Transactions on Circuits and Systems for Video Technology, vol. 17, No. 9, Sep. 2007.
Office Action issued May 26, 2017 in U.S. Appl. No. 14/511,200.
Office Action issued Jun. 20, 2017 in Japanese Application 2016-160844.
Schierl, T., et al., Dependent slices support in HEVC main profile, Joint Collaborative Team on Video Coding (JCT-VC) of ITU-T SG16 WP3 and ISO/IEC JTC1/SC29/WG11, 10th Meeting: Stockholm, SE, Jul. 11-Jul. 20, 2012, Jul. 2, 2012, JC1VC-J0264, URL, http://phenix-it-sudparis.eu/jct/doc_end_user/documens/10-Stockholm/wg11/JCTVC-J0264-v1.zip.
Hsu, Chih-Wei et.al., AHG4: Wavefront tile parallel processing, Joint Collaborative Team on Video Coding (JCT-VC) of ITU-T SG16 WP3 and ISO/IEC JTC1/SC29/WG11, 7th Meeting: Geneva, CH, Nov. 21-30, 2011 Nov. 27, 2011, JOVC-G199, URL, http://phenix-it-sudparis.eu/jct/doc_end_user/documens/7-Geneva/wg11/JC1VCG199-v6.zip.
Decision to Grant mailed Sep. 11, 2017 in Korean Application 10-2016-7034316.
Kiran Misra et al., "Entropy slices for parallel entropy coding", JCT-VC of ITU-T SG16 WP3 and ISO/IEC JTC1/SC29/WG11, 2nd Meeting: Geneva, CH, Jul. 21-28, 2010, Document: JCTVC-B111.
Search Report issued Nov. 30, 2017 in Taiwanese Application 116111143.
Office Action issued Dec. 1, 2017 in Taiwanese Application 106110824.
Notice of Allowance issued Dec. 26, 2017 in U.S. Appl. No. 14/578,814.
Office Action issued Dec. 12, 2017 in Japanese Application 2017-019898.
MenHuang Lee et al., "ROI Slice SEI message", Joint Video Team (JVT) of ISO/IEC MPEG & ITU-T VCED (ISO/IEC JTC1/SC29ANG11 and ITU-T SG16 Q.6) 18th Meetina: Banakok, Thailand, Jan. 2006, JVT-R024. pp. 1-8.
MenHuang Lee et al., "ROI Slice SEI message", JointVideoTeam (JVT) of 15O/IEC MPEG & ITU-T Vced (ISO/IEC JTC1/SC29/WG11 and ITU-T SG16 Q.6), 9th Meeting: Geneva, Switzerland, Apr. 2006, JVT-S054rl, pp. 1-13.
Ye-Kui Wang et al., "Tile groups", Joint Collaborative Team on Video Coding (JCT-VC) of ITU-T SG16 WP3 and ISO/IEC JTC1/SC29/WG11, 8th Meeting: San Jose, CA, USA, Jan. 2012, JC1VC-H0520r1, pp. 1-8.
Skupin, V. George and T. Schierl, "Tile-based region-of-interest signalling with sub-picture SEI messages", Joint Collaborative Team on Video Coding (JCT-Ve) of ITU-T SG16 WP3 and ISO/IEC JTC1/SC29/WG11, 11th Meeting: Shanghai, CN, Oct. 2012, JCTVC-K0218, pp. 1-3.
Office Action issued Dec. 26, 2D17 in Japanese Application 2017-019896.
Yoshihisa YamadA et al., "Standardization trend of High-quality Video Coding Technics", Mitsubishi Electric Technical Report, Japan, Mitsubishi Electric Engineering Company Limited, Dec. 25, 2008, Vo.82, No. 12, pp. 7-10.
Office Action issued Jan. 8, 2018 in U.S. Appl. No. 14/511,200.
Notice of Allowance U.S. Appl. No. 14/510,264 dated Apr. 2, 2018.
Office Action Canadian Patent Application No. 2877045 dated Apr. 23, 2018.
Non-final Office Action U.S. Appl. No. 15/928,742 dated Jun. 15, 2018.
Notice of Allowance U.S. Appl. No. 14/511,200 dated Jun. 22, 2018.
Office Action Japanese Patent Application No. 2016-160844 dated Apr. 24, 2018.
M. Cohan et al., "On Entropy Slices" Joint Collaborative Team on Video Coding (JCT-VC) of ITU-T SG16 WP3 and ISO/IEC JTC1/SC29/WG11, 8th Meeting, San Jose CA, USA Jan. 2012, JCTVC-H0515r2 pp. 1-7.
F. Hen ry et al., Wavefront Parallel Processing't, Joint Collaborative Team on Video Coding (JCT-VC) of ITU-T SG16 WP3 and ISO/IEC JTC1/SC29/WG11, 5th Meeting: Geneva, CH, Mar. 2011, JCTVC-E196, pp. 1-9.
G. Clare et al, "Wavefront and Cabac Flush: Different Degrees of Parallelism Without Transcoding", Joint Collaborative Team on Video Coding (JCT-VC) of ITU-T SG16 WP3 SG16 WP3 and ISO/IEC JTC1/SC29/2G11, 6th Meeting, Torino, IT, Jul. 2011, JCTVC-F275, pp. 1-11.
K. Misra et al., "Harmonization of Entry Points for Tiles and Wavefront Processing", Joint collaborative Team on Video Coding (JCT-VC) of ITU-T SG16 WP3 and ISO/IEC JTC1/SC29/WG11, 7th Meeting: Geneva, CH, Nov. 2011, JCTVC-G722-rl, pp. 1-4.
Kimihiko Kazui etal., AHG9: Improvement of HRD for sub.picture based operation, Joint Collaborative Team on Video Coding LJCT•VC) ofITU•T SG16 WP3 and ISO/IEC JTC1/SC/29 /EG11, 10th Meeting: Stockholm, SE, Jul. 2012, JCTVC-J0136, pp. 1-10.
Notification of Reasons for Refusal Japanese Patent Application No. 2017-019896 dated Jul. 17, 2018.
Official Action Russian Patent Application No. 2016141337/08 dated Aug. 16, 2018.
Non-final Office Action U.S. Appl. No. 16/153,307 dated Dec. 11, 2018.
Jie Zhao, Parallel entropy decoding for high resolution video coding, Visual Communications and Image Processing 2009, p. 1-12.
Notification of Reasons for Refusal Japanese Patent Application No. 2016-160844 dated Nov. 20, 2018.
Notice of Acceptance of Application dated Jan. 7, 2019 issued in Australian Patent Application No. 2016259446.
Office Action dated Dec. 26, 2018 issued in India Patent Application No. 2390/KOLNP/2014.
Notice of Allowance U.S. Appl. No. 15/928,742 dated Jan. 24, 2019.
Extended European Search Report EP Application No. 18211768.9 dated Feb. 27, 2019.
Notice of Allowance Taiwanese Patent Application No. 2107128325 dated Mar. 29, 2019.
Notification of Reasons for Refusal Japanese Patent Application No. 2017-019896 dated Feb. 20, 2019.
Notice of Allowance U.S. Appl. No. 16/153,307 dated Apr. 24, 2019.
Office Action Israeli Patent Application No. 261382 dated May 26, 2019.
Hendry et at, "AHG4: Unified marker for Tiles' and WPP's entry points", Joint Collaborative Team on Video Coding (JCT-VC) of ITU-T SG 16 WP 3 and ISO/IEC ITC 1/SC 29/WG 11 9th Meeting: Geneva, CH, Apr. 27-May 7, 2012.
Opposition by Unified Patents, LLC to EP 3151566 (EP 16200327.1) dated Mar. 22, 2023.
Wang, V_-K., et al., "Text for tiles, WPP and entropy slices", JCT-VC of ITU-T SG16 WP3 and ISO/IEC JTC1/SC29/WG11, 8th Meeting: San Jose, US, Feb. 1-10, 2012, JCTVC-H0737.
Bross, B., et al., "WD 5: Working Draft 5 of High-Efficiency Video Coding", JCT-VC of ITU-T SG16 WP3 and ISO/IEC JTC1/SC29/WG11, 7th Meeting: Geneva, CH, Nov. 21-30, 2011, JCTVC-G1103_d9.
Apostolopoulos, J_, et al., "Video streaming: Concepts, algorithms, and systems", Hewlett-Packard Company, Nov. 2002.
ITU-T-T.810 (May 2006), Series T: Terminals for Telematic Services, Information technology-JPEG 2000 image boding system: Wireless.
Bradley, A.P., et al., "JPEG 2000 and Region of Interest Coding", DICTA2002: Digital Image Computing Techniques and Applications, Melbourne, AU, Jan. 21-22, 2002.

(56) References Cited

OTHER PUBLICATIONS

Grangetto, M., et at, Retransmission Strategies for Optimized JPEG 2000 Image Transmission in Wireless Environmenf, 12th European Signal Processing Conference, Vienna, AT, 2004, pp. 253-256.
Grangetto, M., et at, "Error Sensitivity Data Structures and Retransmission Strategies for Robust JPEG 2000 Wireless Imaging", IEEE Transactions on Consumer Electronics, vol. 49, No. 4, Nov. 2003.
Wikipedia entry for "Retransmission (data networks)" as of Nov. 18, 2011, retrieved from Wayback Machine at archive.org.
Office Action issued in corresponding Chinese Patent Application 202210892463.8 dated May 7, 2023.
Office Action issued in corresponding Israeli Patent Application 299951 dated May 23, 2023.
Notice of Allowance issued in corresponding Canadian Patent Application 3,095,638 dated May 29, 2023.
Notice of Allowance issued in corresponding Taiwanese Patent Application 110145622 dated May 22, 2023, with English translation.
Communication issued in corresponding European Patent 3151 566 dated Jun. 5, 2023.
Kiran Misra et al., "New results for parallel decoding for Tiles", Joint Collaborative Team on Video Coding {JCT-VC} of ITU-T SG16 WP3 and 1S0/IEC JTC1/SC29/WG11 6th Meeting: Torino, IT, Jul. 14-22, 2011.
Kiran Misra et al., • JCTVC: New results for parallel decoding of tiles {JCTVCW-E412), Sharp Laboratories of America.
Sullivan, G., et al., "Meeting report of the sixth meeting of the Joint Collaborative Team on Video Coding (JCT-VG), Torino, IT, Jul. 14-22, 2011", JCT-VC of ITU-T SG16 WP3 and 1SO/IEC JTC1/SC29/WG11, 6th Meeting: Torino, IT, Jul. 14-22, 2011, JCTVC-F800.
Office Action issued in corresponding Chinese Patent Application 202210892454.9 dated Jun. 10, 2023.
Office Action (Notice of Allowance) issued in corresponding Thai Patent Application 1401006173 dated Jun. 12, 2023.
Office Action issued in corresponding Taiwanese Patent Application 111119402 dated May 30, 2023, with English translation.
Office Action issued in corresponding Thai Patent Application 1401007775 dated Jul. 10, 2023.
Office Action issued in corresponding Chinese Patent Application 2022108941811 dated Jun. 29, 2023.
Notice of Acceptance issued in corresponding Australian Patent Application 2022268403 dated Jun. 1, 2023.
Office Action (Notice of Allowance) issued in corresponding Israeli Patent Application 301488 dated Jul. 20, 2023.
Notice of Allowance issued in corresponding Vietnamese Application No. 1-2018-05191 dated Jun. 30, 2023, with English translation.
Office Action issued in corresponding Japanese Patent Application No. 2022-142936 dated Jul. 11, 2023, with English translation.
Office Action issued in corresponding Israeli Application No. 292629 dated Aug. 16, 2023.
Office Action issued in corresponding Chinese Patent Application No. 202210892431.8 dated Aug. 12, 2023.
Office Action issued in corresponding Russian Patent Application No. 2022103151 dated May 24, 2022, with English translation.
Office Action issued in corresponding Russian Patent Application No. 2021129920 dated May 18, 2022, with English translation.
Office Action (Notice of Issuance) issued in corresponding Chinese Patent Application No. 2019108763916 dated Jun. 15.2022.
Office Action issued in corresponding Brazilian Patent Application No. BR1220200079142 dated Jun. 9, 2022.
Office Action issued in corresponding Brazilian Patent Application No. BR1220200079126 dated Jun. 9, 2022.
Notice of Allowance issued in corresponding U.S. Appl. No. 15/930,937 dated Oct. 14, 2021.
Office Action issued in corresponding U.S. Appl. No. 15/930,937 dated Jun. 29, 2021.
Office Action issued in corresponding Australian Patent Application 2020289848 issued Jun. 29, 2022.
Office Action issued in corresponding Brazilian Patent Application 11 2014 025496-6 issued Jun. 1, 2022.
Office Action issued in corresponding Brazilian Patent Application 1220200076216 issued Jun. 1, 2022.
Office Action issued in corresponding Brazilian Patent Application 11 2014 032687 8 issued Jun. 9, 2022.
Office Action issued in corresponding Canadian Patent Application No. 3,095,638 issued Jul. 18, 2022.
Office Action (Notice of Acceptance) issued in corresponding Australian Patent Application 2021201682 dated Jun. 27, 2022.
Office Action (Notice of Acceptance) issued in corresponding Australian Patent Application 2022201459 dated Aug. 4, 2022.
Office Action (Decision to Grant) issued in corresponding Japanese Patent Application 2021-062819 dated Aug. 5, 2022, with English translation.
Office Action (Notice before Examination) issued in corresponding Israeli Patent Application 295693 dated Aug. 17, 2022.
Office Action issued in corresponding Malaysian Patent Application PI 2018000457 dated Aug. 31, 2022, with English translation.
Office Action (Decision to Grant) issued in corresponding Korean Patent Application 10-2021-7037683 dated Aug. 24. 2022, with English translation.
Office Action (Notice for Eligibility of Grant) issued in corresponding Singapore Patent Application 10201809547W dated Sep. 6, 2022.
Office Action issued in corresponding Taiwanese Patent Application 110145622 dated Aug. 22, 2022, with English translation.
Summons to attend oral proceedings issued in corresponding European Patent No. 3151566 dated Sep. 22, 2022.
Fuldseth, A., et al., "Tiles", Joint Collaborative Team on Video Coding (JCT-VC) of ITU-T SG16 WP3 and 1SO/IEC JTC1/SC29/WG11 6th Meeting: Torino, IT, Jul. 14-22, 2011, JCTVC-F335.
Office Action issued in corresponding Mexican Patent Application MX/a/2016/016671 dated Sep. 2, 2022, with English translation.
Office Action (Decision to Grant) issued in corresponding Russian Patent Application 2021129920 dated Sep. 30, 2022, with English translation.
Office Action (Decision to Grant) issued in corresponding Russian Patent Application 2021129916 dated Oct. 10, 2022, with English translation.
Office Action (Notice before Allowance) issued in corresponding Israeli Patent Application No. 283196 dated Dec. 4, 2022.
Office Action issued in corresponding Indonesian Patent Application No. P00202002290 dated Oct. 17, 2022, with English translation.
Office Action issued in corresponding Brazilian Patent Application No. BR1220200079126 dated Nov. 18, 2022.
Office Action issued in corresponding Brazilian Patent Application No. BR 11 2014 025496-6 dated Nov. 9, 2022.
Office Action issued in corresponding Brazilian Patent Application No. BR 1220200076216 dated Nov. 9, 2022.
Office Action (Notice of Issuance) issued in corresponding Brazilian Patent Application No. BR 11 2014 032687 8 dated Nov. 18, 2022.
Office Action (Notice of Issuance) issued in corresponding Brazilian Patent Application No. BR 1220200079142 dated Nov. 18, 2022.
Office Action issued in corresponding Australian Patent Application No. 2022252837 dated Dec. 7, 2022, with English translation.
Office Action issued in corresponding U.S. Appl. No. 17/321,505 dated Dec. 1, 2022.
Office Action (Notice of Allowance) issued in corresponding Vietnamese Patent Application 1-2019-02TT2 dated Dec. 26, 2022, with English translation.
Office Action (Notice of Allowance) issued in corresponding Vietnamese Patent Application 1-2019-02TT4 dated Dec. 26, 2022, with English translation.
Office Action (Notice of Allowance) issued in corresponding Vietnamese Patent Application 1-2019-02TT1 dated Dec. 26, 2022, with English translation.
Office Action (Notice of Allowance) issued in corresponding Vietnamese Patent Application 1-2019-02TT3 dated Dec. 26, 2022, with English translation.
Office Action issued in corresponding Australian Patent Application 2022268403 dated Jan. 5, 2023.

(56) References Cited

OTHER PUBLICATIONS

Office Action (Notice before Examination) issued in corresponding Israeli Patent Application 299951 dated Jan. 18, 2023.
Office Action issued in corresponding Korean Patent Application 10-2022-7022147 dated Feb. 8, 2023, with English translation.
Office Action issued in corresponding Russian Patent Application 2022118841 dated Feb. 10, 2023, with English translation.
Office Action issued in corresponding Japanese Patent Application 2022-015321 dated Feb. 7, 2023, with English translation.
Office Action (Extended European Search Report) issued in corresponding European Patent Application 22206072.5 dated Mar. 16, 2023.
Office Action (Notice before Examination) issued in corresponding Israeli Patent Application 301488 dated Mar. 20, 2023.
OfficeAction (Notice of Allowance) issued in corresponding Mexican Patent Application MX/a/2016/016671 dated Feb. 27, 2023.
Office Action issued in corresponding Korean Patent Application 10-2022-7041490 dated Mar. 7, 2023, with English translation.
Final Office Action issued in corresponding U.S. Appl. No. 17/689,622 dated Apr. 18, 2023.
Notice of Allowance issued in corresponding U.S. Appl. No. 17/321,505 dated May 11, 2023.
Office Action issued in corresponding Brazilian Patent Application BR1220200079126 dated Mar. 8, 2023.
Song, Dongdong, "The Research and Analysis of Digital Television Transport Stream Monitoring", from China's Master's Theses Full-text Database (Information Technology), Issue Date: Mar. 15, 2011, 75 pgs, with English abstract.

* cited by examiner

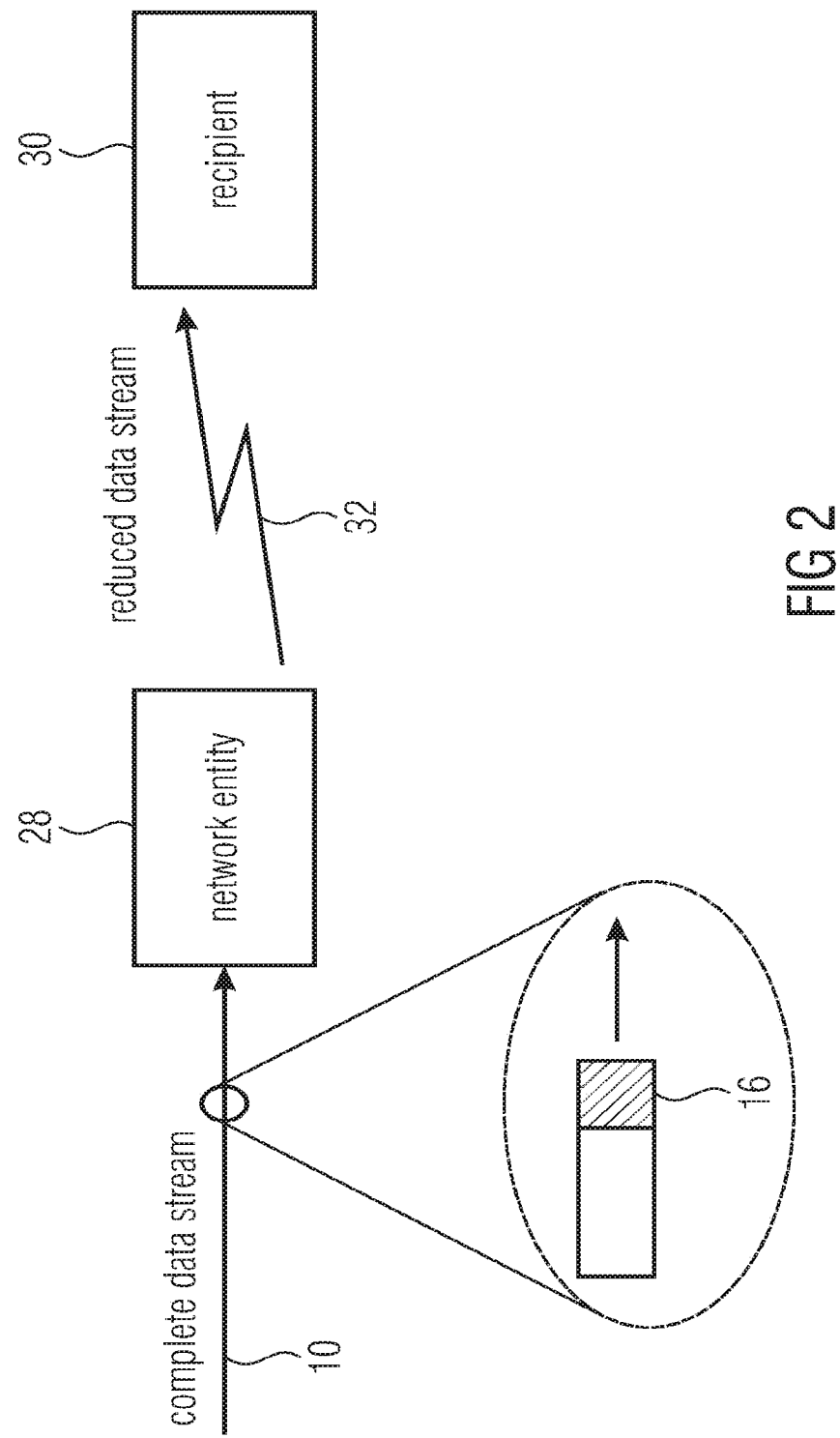

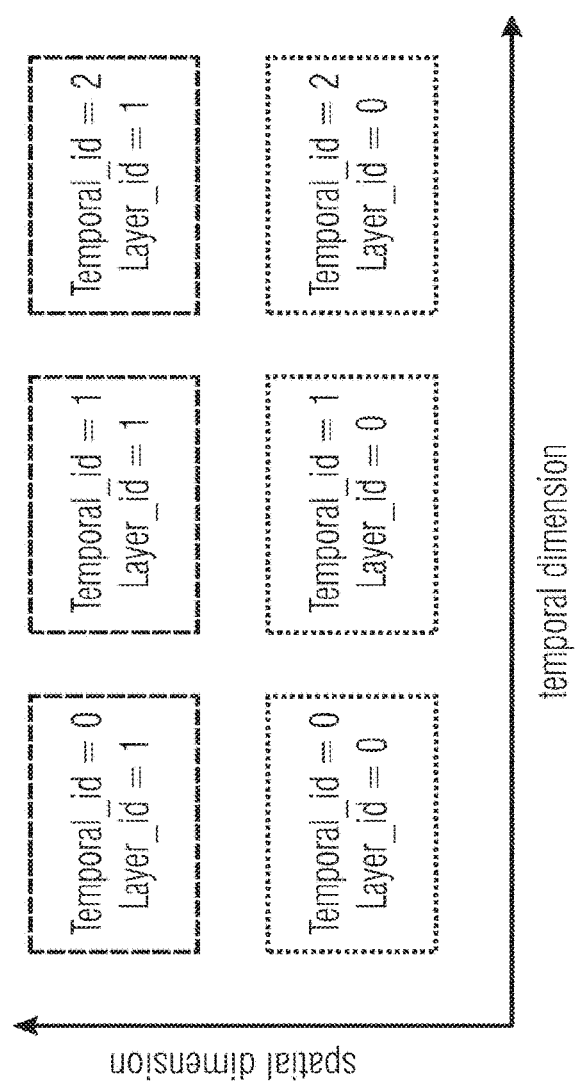
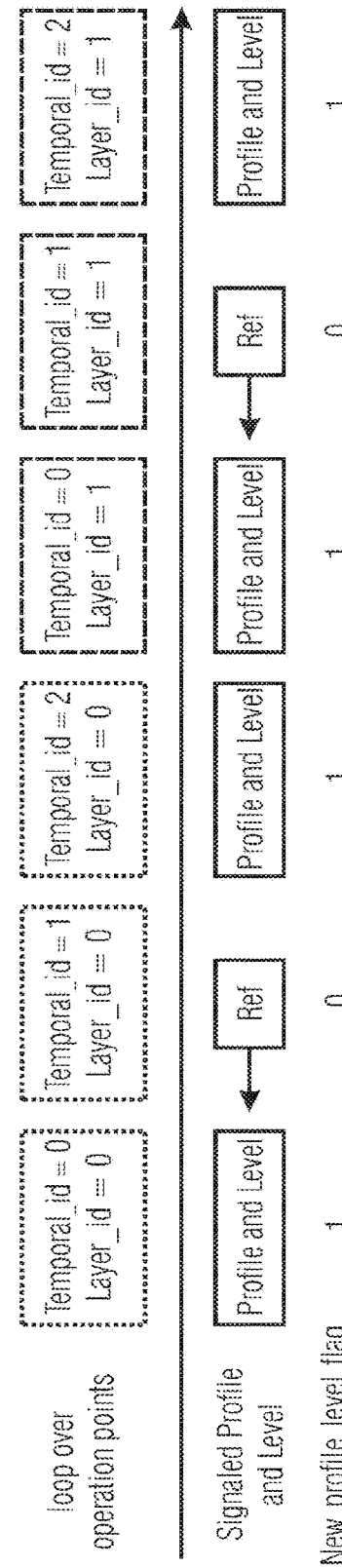
FIG 3A
FIG 3B

| | Descriptor |
|---|---|
| nal_unit( NumBytesInNALunit ) { | |
|   forbidden_zero_bit | f(1) |
|   nal_ref_flag    — 16 | u(1) |
|   nal_unit_type | u(6) |
|   NumBytesInRBSP = 0   — 64 | |
|   layer_scenario   — 60 | u(2) |
|   layer_id | u(6) |
|   for( i = nalUnitHeaderBytes; i < NumBytesInNALunit; i++ ) { | |
|     if( i + 2 < NumBytesInNALunit && next_bits( 24 ) == 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

| video_parameter_set_rbsp( ) { | Descriptor |
|---|---|
|    video_parameter_set_id | u(8) |
|    profile_idc | u(8) |
|    reserved_zero_8bits /* equal to 0 */ | u(8) |
|    level_idc | u(8) |
|    layer_id_type | u(7) |
|    vps_extension_flag | u(1) |
|    if( vps_extension_flag ) | |
|      while( more_rbsp_data( ) ) | |
|        vps_extension_data() | u(1) |
|    rbsp_trailing_bits( ) | |
| } | |

FIG 5

| | Descriptor |
|---|---|
| vps_extension_data() { | |
|    layer_id | u(6) |
|    new_profile_level_flag | u(1) |
|    reserved_zero_1_bit | u(1) |
|    if ( new_profile_level_flag == 1 ) { | |
|       profile_idc | u(8) |
|       reserved_zero_8bits /* equal to 0 */ | u(8) |
|       level_idc | u(8) |
|    } else { | |
|       ref_layer_id | u(6) |
|       reserved_zero_2_bits | u(2) |
|    } | |
| } | |

FIG 6

| nal_unit( NumBytesInNALunit ) { | Descriptor |
|---|---|
| forbidden_zero_bit | f(1) |
| nal_ref_flag | u(1) |
| nal_unit_type | u(6) |
| NumBytesInRBSP = 0 | |
| temporal_id | u(3) |
| ~~reserved_one_5bits~~ | u(5) |
| // layer_id_plus1 | u(5) |
| for( i = naiUnitHeaderBytes; i < NumBytesInNALunit; i++ ) { | |
|   if( i + 2 < NumBytesInNALunit && next_bits( 24 ) == 0x000003 ) { | |
|     rbsp_byte[ NumBytesInRBSP++ ] | b(8) |
|     rbsp_byte[ NumBytesInRBSP++ ] | b(8) |
|     i += 2 | |
|     emulation_prevention_three_byte /* equal to 0x03 */ | f(8) |
|   } else | |
|     rbsp_byte[ NumBytesInRBSP++ ] | b(8) |
| } | |
| } | |

FIG 11

| seq_parameter_set_rbsp( ) { | Descriptor |
|---|---|
| ~~profile_space~~ | ~~u(3)~~ |
| ~~profile_idc~~ | ~~u(5)~~ |
| ~~constraint_flags~~ | ~~u(16)~~ |
| ~~level_idc~~ | ~~u(8)~~ |
| ~~for( i = 0; i < 32; i++ )~~ | |
| ~~profile_compatability_flag[ i ]~~ | ~~u(1)~~ |
| seq_parameter_set_id | ue(v) |
| video_parameter_set_id | ue(v) |
| chroma_format_idc | ue(v) |
| if( chroma_format_idc == 3 ) | |
| separate_colour_plane_flag | u(1) |
| ~~sps_max_temporal_layers_minus1~~ | ~~u(3)~~ |
| pic_width_in_luma_samples | ue(v) |
| pic_height_in_luma_samples | ue(v) |
| pic_cropping_flag | u(1) |
| if( pic_cropping_flag ) { | |
| pic_crop_left_offset | ue(v) |
| pic_crop_right_offset | ue(v) |
| pic_crop_top_offset | ue(v) |
| pic_crop_bottom_offset | ue(v) |
| } | |
| bit_depth_luma_minus8 | ue(v) |
| bit_depth_chroma_minus8 | ue(v) |
| | |
| pcm_enabled_flag | u(1) |
| if( pcm_enabled_flag ) { | |
| pcm_sample_bit_depth_luma_minus1 | u(4) |
| pcm_sample_bit_depth_chroma_minus1 | u(4) |

FIG 12A

| FIG 12 | FIG 12A |
|---|---|
| | FIG 12B |
| | FIG 12C |

| | |
|---|---|
| } | |
| log2_max_pic_order_cnt_lsb_minus4 | ue(v) |
| for( i = 0; i <= sps_max_temporal_layers_minus1; i++ ) { | |
| sps_max_dec_pic_buffering[ i ] | ue(v) |
| sps_num_reorder_pics[ i ] | ue(v) |
| sps_max_latency_increase[ i ] | ue(v) |
| } | |
| restricted_ref_pic_lists_flag | u(1) |
| if( restricted_ref_pic_lists_flag ) | |
| lists_modification_present_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| if( pcm_enabled_flag ) { | |
| log2_min_pcm_coding_block_size_minus3 | ue(v) |
| log2_diff_max_min_pcm_coding_block_size | ue(v) |
| } | |
| max_transform_hierarchy_depth_inter | ue(v) |
| max_transform_hierarchy_depth_intra | ue(v) |
| scaling_list_enable_flag | u(1) |
| if( scaling_list_enable_flag ) { | |
| sps_scaling_list_data_present_flag | u(1) |
| if( sps_scaling_list_data_present_flag ) | |
| scaling_list_param( ) | |
| } | |
| chroma_pred_from_luma_enabled_flag | u(1) |
| transform_skip_enabled_flag | u(1) |
| seq_loop_filter_across_slices_enabled_flag | u(1) |

FIG 12B

| FIG 12 | FIG 12A |
|---|---|
| | FIG 12B |
| | FIG 12C |

| | |
|---|---|
| asymmetric_motion_partitions_enabled_flag | u(1) |
| nsrqt_enabled_flag | u(1) |
| sample_adaptive_offset_enabled_flag | u(1) |
| adaptive_loop_filter_enabled_flag | u(1) |
| if( adaptive_loop_filter_enabled_flag ) | |
|    alf_coef_in_slice_flag | u(1) |
| if( pcm_enabled_flag ) | |
|    pcm_loop_filter_disable_flag | u(1) |
| ~~sps_temporal_id_nesting_flag~~ | ~~u(1)~~ |
| | |
| if( log2_min_coding_block_size_minus3 == 0 ) | |
|    inter_4x4_enabled_flag | u(1) |
| num_short_term_ref_pic_sets | ue(v) |
| for( i = 0; i < num_short_term_ref_pic_sets; i++ ) | |
|    short_term_ref_pic_set( i ) | |
| long_term_ref_pics_present_flag | u(1) |
| sps_temporal_mvp_enable_flag | u(1) |
| vui_parameters_present_flag | u(1) |
| if( vui_parameters_present_flag ) | |
|    vui_parameters( ) | |
| sps_extension_flag | u(1) |
| if( sps_extension_flag ) | |
|    while( more_rbsp_data( ) ) | |
|      sps_extension_data_flag | u(1) |
| rbsp_trailing_bits( ) | |
| } | |

| video_parameter_set_rbsp( ) { | Descriptor |
|---|---|
|   video_parameter_set_id | u(8) |
|   scalability_type | u(4) |
|   ~~vps_temporal_id_nesting_flag~~ | u(1) |
|   ~~vps_max_temporal_layers_minus1~~ | u(3) |
|   profile_space | u(3) |
|   profile_idc | u(5) |
|   constraint_flags | u(16) |
|   for( i = 0; i < 32; i++ ) | |
|     profile_compatability_flag[ i ] | u(1) |
|   for( i = 0; i < vps_max_temporal_layers_minus1; i++ ) { | |
|     level_idc[ i ] | u(8) |
|     ~~vps_max_dec_pic_buffering[ i ]~~ | ~~ue(v)~~ |
|     ~~vps_num_reorder_pics[ i ]~~ | ~~ue(v)~~ |
|     ~~vps_max_latency_increase[ i ]~~ | ~~ue(v)~~ |
|   } | |
|   for( n = 0; i < max_dim (scalability_type); n++ ) { | |
|     layer_id_plus1_dim_len[ n ] | u(3) |
|   } | |
|   vps_extension_flag | u(1) |
|   if( vps_extension_flag ) | |
|     while( more_rbsp_data( ) ) | |
|       vps_extension_data() | u(1) |
|   rbsp_trailing_bits() | |
| } | |

| | Descriptor |
|---|---|
| vps_extension_data() { | |
|   vps_extension_type | u(2) |
|   layer_id_plus1 | u(5) |
|   max_temporal_layers_minus1 | u(3) |
|   new_profile_level_flag | u(1) |
|   if ( new_profile_level_flag == 0 ) { | |
|     profile_reference_layer_id_plus1 | u(5) |
|   } | |
|   else { | |
|     profile_space | u(3) |
|     profile_idc | u(5) |
|     constraint_flags | u(16) |
|     for( i = 0; i < 32; i++ ) | |
|       profile_compatability_flag[ i ] | u(1) |
|     for( i = 0; i < max_layer_tmp_level; i++ ) | |
|       level_idc[ i ] | u(8) |
|   } | |
|   num_reference_layers | u(5) |
|   for( n = 0; n < num_reference_layers; n++ ) | |
|     direct_coding_dependency_layer_id_plus1[ n ] | u(5) |
| } | |

SCALABLE DATA STREAM AND NETWORK ENTITY

CROSS REFERENCE TO RELATED APPLICATIONS

The present application is a continuation of U.S. patent application Ser. No. 17/587,849 filed Jan. 28, 2022, which is a continuation of U.S. patent application Ser. No. 15/930,937, filed May 13, 2020, now U.S. Pat. No. 11,259,034, which is a continuation of U.S. patent application Ser. No. 16/025,319 filed Jul. 2, 2018, now U.S. Pat. No. 10,694,198, which is a continuation of U.S. patent application Ser. No. 14/510,264, filed Oct. 9, 2014, now U.S. Pat. No. 10,045,017, which is a continuation of International Application PCT/EP2013/057803, filed Apr. 15, 2013, and additionally claims priority from U.S. Patent Applications 61/624,098, filed Apr. 13, 2012, and 61/666,185, filed Jun. 29, 2012, all of which are incorporated herein by reference in their entireties.

BACKGROUND OF THE INVENTION

The present invention is concerned with scalable data streams such as scalable video streams and network entities dealing with such scalable data streams such as, for example, a decoder or MANE (media-aware network element).

From a transport perspective, adaptation of video bitstreams in temporal or other dimensions is highly desirable, as was already identified and addressed within the standardization of H.264/AVC. The encapsulation of video data into Network Abstraction Layer (NAL) units and the design decision to signal many important but rather invariant parameters outside the video bitstream in so called Parameter Sets reflect this understanding. The Scalable Video Coding (SVC) and Multiview Video Coding (MVC) extensions of H.264/AVC allow for adaptation beyond the temporal dimension but a lack of extensibility in the base specification of H.264/AVC led to complicated approaches to extend the H.264/AVC high level syntax in a backward compatible way. In H.264/AVC and its extensions the signaling of operation points along the scalability dimensions is done by means of NAL units header extensions that include an extra byte for this purpose. The same information is provided by the so-called prefix NAL units for NAL units that contain pure H.264/AVC video data and constitute the so-called base layer. A mechanism to extend the information provided via Sequence Parameter Set (SPS) of the base layer for the enhanced layers, coded by the extensions of H.264/AVC, is established via so-called Subset Sequence Parameter Sets (SSPS).

While the development of the HEVC base specification is still ongoing, efforts towards a 3D video coding extension are already taken in order to assure an extensible syntax in the base specification in the beginning. These so-called scalable hooks in the base specification need to be designed carefully to be future-proof. The following paragraphs give an overview on the current status of the HEVC High Level (HL) syntax and the concepts that are under discussion at the moment.

The current status of the HEVC standardization is as follows:

During the ongoing HEVC base specification and the 3D extensions, numerous participants made proposals on how to proceed from the HL syntax as specified in H.264/AVC. The outcome is reflected in the current working draft of the specification and the numerous contributions of the individual participants. The following paragraphs give an overview on the current discussion.

As stated above, the signalization of operation points within the scalability dimensions of an SVC or MVC video bitstream necessitates (specific) extensions of the H.264/AVC NAL unit headers. This is regarded as an unclean solution, causing extra effort e.g. for parsing multiple different NAL unit header structures and necessitating prefix NAL units to signal the base layer. Therefore, an effort was made to ensure that the base HEVC NAL unit header syntax is versatile enough to satisfy the needs of the future extensions of the base specification.

In the syntax of a NAL unit as in the current working draft, a current consensus was to use a two byte NAL unit header. In the first byte, nal_ref_flag is signaled with on bit opposed to the two bits of nal_ref_idc in H.264/AVC, as this HL feature has not been widely used in applications. The syntax element nal_unit_type therefore has one more bit to signal the type of the NAL unit, which allows for a total of 64 distinguishable types.

The second byte of the NAL unit header is divided into two parts, where lc bits are used to signal temporal_id of the NAL unit as temporal scalability is already enabled in the base specification. The remaining 5 bits of the second byte are reserved to be equal to one within a HEVC conforming bitstream. The current understanding of the usage of the remaining 5 bits is that they can be used to signal scalability identifiers in future extensions, e.g. for a layer_id syntax element.

While Picture Parameter Set (PPS) and Sequence Parameter Set as defined in the current HEVC base specification are relatively similar to what has formerly been specified in H.264/AVC, two new Parameter Sets, referred to as the Adaptation Parameter Set (APS) and Video Parameter Set (VPS), have been introduced to HEVC of which only the VPS is relevant for the content of this document.

The Video Parameter Set was supposed to signal parameters such as the number of (e.g. temporal) level/layer present in the video bitstream and the profile and level for all operation points within. Other parameters to be signaled include the dependencies between scalable layers, much as it is signaled in the SVC scalability information SEI messages.

An additional brief explanation is presented below with regard to the semantics of the NAL unit and Video Parameter Set syntax.

profile_idc and level_idc indicate the profile and level to which the coded video sequence conforms.

max_temporal_layers_minus1+1 specifies the maximum number of temporal layers present in the sequence. The value of max_temporal_layers_minus1 shall be in the range of 0 to 7, inclusive.

more_rbsp_data( ) is specified as follows.
  If there is no more data in the RBSP, the return value of more_rbsp_data( ) is equal to FALSE.
  Otherwise, the RBSP data is searched for the last (least significant, right-most) bit equal to 1 that is present in the RBSP. Given the position of this bit, which is the first bit (rbsp_stop_one_bit) of the rbsp_trailing_bits( ) syntax structure, the following applies.
  If there is more data in an RBSP before the rbsp_trailing_bits( ) syntax structure, the return value of more_rbsp_data( ) is equal to TRUE.
  Otherwise, the return value of more_rbsp_data( ) is equal to FALSE.

nal_ref_flag equal to 1 specifies that the content of the NAL unit contains a sequence parameter set, a picture parameter set, an adaptation parameter set or a slice of a reference picture.

For coded video sequences conforming to one or more of the profiles specified in Annex 10 that are decoded using the decoding process specified in clauses 2-9, nal_ref_flag equal to 0 for a NAL unit containing a slice indicates that the slice is part of a non-reference picture.

nal_ref_flag shall be equal to 1 for sequence parameter set, picture parameter set or adaptation parameter set NAL units. When nal_ref_flag is equal to 0 for one NAL unit with nal_unit_type equal to 1 or 4 of a particular picture, it shall be equal to 0 for all NAL units with nal_unit_type equal to 1 or 4 of the picture.

nal_ref_flag shall be equal to 1 for NAL units with nal_unit_type equal to 5.

nal_ref_flag shall be equal to O for all NAL units having nal_unit_type equal to 6, 9, 10, 11, or 12.

nal_unit_type specifies the type of RBSP data structure contained in the NAL unit as specified in Table 1.

Decoders shall ignore (remove from the bitstream and discard) the contents of all NAL units that use reserved values of nal_unit_type.

TABLE 1 possible (not exhaustive list of) NAL unit type codes and NAL unit type classes

| nal_unit_type | Content of NAL unit and RBSP syntax structure | NAL unit type class |
|---|---|---|
| 0 | Unspecified | non-VCL |
| 1 | Coded slice of non-IDR, non-CRA and non-TLA picture slice_layer_rbsp( ) | VCL |
| 2 | Reserved | n/a |
| 3 | Coded slice of TLA picture slice_layer_rbsp( ) | VCL |
| 4 | Coded slice of a CRA picture slice_layer_rbsp( ) | VCL |
| 5 | Coded slice of an IDR picture slice_layer_rbsp( ) | VCL |
| 6 | Supplemental enhancement information (SEI) sei_rbsp( ) | non-VCL |
| 7 | Sequence parameter set seq_parameter_set_rbsp( ) | non-VCL |
| 8 | Picture parameter set pic_parameter_set_rbsp( ) | non-VCL |
| 9 | Access unit delimiter access_unit_delimiter_rbsp( ) | non-VCL |
| 10-11 | Reserved | n/a |
| 12 | Filler data filler_data_rbsp( ) | non-VCL |
| 13 | Reserved | n/a |
| 14 | Adaption parameter set aps_rbsp( ) | non-VCL |
| 15-23 | Reserved | n/a |
| 24 . . . 63 | I Unspecified | non-VCL |

A "profile" is a subset of the entire bitstream syntax. Within the bounds imposed by the syntax of a given profile it is still possible to necessitate a very large variation in the performance of encoders and decoders depending upon the values taken by syntax elements in the bitstream such as the specified size of the decoded pictures. In many applications, it is currently neither practical nor economic to implement a decoder capable of dealing with all hypothetical uses of the syntax within a particular profile.

In order to deal with this problem, "levels" are specified within each profile. A level is a specified set of constraints imposed on values of the syntax elements in the bitstream. These constraints may be simple limits on values. Alternatively they may take the form of constraints on arithmetic combinations of values (e.g., picture width multiplied by picture height multiplied by number of pictures decoded per second).

level: A defined set of constraints on the values that may be taken by the syntax elements and variables. The same set of levels is defined for all profiles, with most aspects of the definition of each level being in common across different profiles. Individual implementations may, within specified constraints, support a different level for each supported profile. In a different context, level is the value of a transform coefficient prior to scaling.

profile: A specified subset of the syntax.

In the development of the 3D video coding extension for HEVC, there has also been the proposal to shift certain parameters from the slice header to the Access Unit Delimiter (AUD), a NAL unit that optionally stands in the beginning of a new Access Unit (AU) m H.264/AVC.

Another proposal during the course of the specification of the HEVC 3D video coding extension is to signal the dependencies between operation points by means of indirection between SPSs. The NAL unit header is supposed to carry a reference to a SPS and within each SPS is a reference to the relative base SPS. This (potentially cascaded) indirection has to be resolved until the SPS for the lowest (temporal, . . . ) level. Such an approach puts a high burden on devices such as a MANE to look deep into the bitstream and hold a substantial amount of information available for the purpose of identifying operation points.

In any case, it would still be favorable to have a solution at hand which facilitates, or renders more efficient, the handling of scalable data streams by network entities.

SUMMARY

An embodiment may have a data stream into which a media content is coded, the data stream including packets, each packet including an packet type identifier identifying a packet type associated with the respective packet, out of a plurality of packet types, wherein each packet having a packet type out of a first set of the plurality of packet types associated therewith, includes an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or equals the operation point associated with the respective packet, wherein each packet having a predetermined packet type disjoint to the second set associated therewith, has an scalability axes descriptor defining the number n and a semantic meaning of the one or more scalability axes.

Another embodiment may have a data stream into which a media content is coded, the data stream including packets, each packet including a packet type identifier identifying a packet type associated with the respective packet, out of a plurality of packet types, wherein each packet having a packet type out of a first set of the plurality of packet types associated therewith, includes an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or is equals the operation point associated with the respective packet, wherein each packet having a predetermined packet type disjoint to the second set associated therewith, includes a sequence of profile and/or level descriptors each associated with one or more of at least a subset of the plurality of operation points, each profile and/or level descriptor defining an available coding option set and/or an available syntax element value range which a sequence of packets having an operation point associated with the respective profile and/or level descriptor, associated therewith, obey, wherein a first set of the profile and/or level descriptors explicitly signal the definition of the available coding option set and/or available syntax element value range, and a second, disjoint non-empty set of the profile and/or level descriptors signal the definition of the available coding option set and/or available syntax element value range by referencing another profile and/or level descriptor.

Another embodiment may have a network entity for processing a data stream into which a media content is coded, the data stream including packets, each packet including an packet type identifier identifying a packet type associated with the respective packet, out of a plurality of packet types, wherein each packet having a packet type out of a first set of the plurality of packet types associated therewith, includes an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or equals the operation point associated with the respective packet, wherein the network entity is configured to read from a packet having a predetermined packet type disjoint to the second set associated therewith, a scalability axes descriptor defining the number n and a semantic meaning of the one or more scalability axes, and interpret the operation point identifiers depending on the scalability axes descriptor.

Another embodiment may have a network entity for processing a data stream into which a media content is coded, the data stream including packets, each packet including an packet type identifier identifying a packet type associated with the respective packet, out of a plurality of packet types, wherein each packet having a packet type out of a first set of the plurality of packet types associated therewith, includes an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or is equals the operation point associated with the respective packet, wherein the network entity is configured to read from a packet having a predetermined packet type disjoint to the second set associated therewith, a sequence of profile and/or level descriptors each associated with one or more of at least a subset of the plurality of operation points, each profile and/or level descriptor defining an available coding option set and/or an available syntax element value range which a syntax of packets having an operation point associated with the respective profile and/or level descriptor, associated therewith, obey, wherein the network entity is configure to, responsive to a signaling in the data stream, explicitly read from a first set of the profile and/or level descriptors the definition of the available coding option set and/or available syntax element value range, and read, for a second, disjoint non-empty set of the profile and/or level descriptors, a reference to another profile and/or level descriptor and derive the definition of the available coding option set and/or available syntax element value range of the second, disjoint non-empty set of the profile and/or level descriptors from the respective referenced profile and/or level descriptor.

According to another embodiment, a method for processing a data stream into which a media content is coded, the data stream including packets, each packet including an packet type identifier identifying a packet type associated with the respective packet, out of a plurality of packet types, wherein each packet having a packet type out of a first set of the plurality of packet types associated therewith, includes an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or equals the operation point associated with the respective packet, may have the steps of: reading from a packet having a predetermined packet type disjoint to the second set associated therewith, a scalability axes descriptor defining the number n and a semantic meaning of the one or more scalability axes, and interpreting the operation point identifiers depending on the scalability axes descriptor.

According to another embodiment, a method for processing a data stream into which a media content is coded, the data stream including packets, each packet including an packet type identifier identifying a packet type associated with the respective packet, out of a plurality of packet types, wherein each packet having a packet type out of a first set of the plurality of packet types associated therewith, includes an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or is equals the operation point associated with the respective packet, may have the steps of: reading from a packet having a predetermined packet type disjoint to the second set associated therewith, a sequence of profile and/or level descriptors each associated with one or more of at least a subset of the plurality of operation points, each profile and/or level descriptor defining an available coding option set and/or an available syntax element value range which a syntax of packets having an operation point associated with the respective profile and/or level descriptor, associated therewith, obey, wherein the network entity is configure to, responsive to a signaling in the data stream, explicitly read from a first set of the profile and/or level descriptors the definition of the available coding option set and/or available syntax element value range, and read, for a second, disjoint non-empty set of the profile and/or level descriptors, a reference to another profile and/or level descriptor and derive the definition of the available coding option set and/or available syntax element value range of the second, disjoint non-empty set of the profile and/or level descriptors from the respective referenced profile and/or level descriptor.

Another embodiment may have a computer program for performing an inventive method for processing, when the computer program runs on a computer or processor.

It is a basic finding of the present invention that the handling of scalable data streams by network entities is rendered less complex if, in the data stream, packets which actually carry data are accompanied by packets of a different packet type which have a scalability axes descriptor defining the number of scalability axes and a semantic meaning thereof. By this measure, it is sufficient if the data carrying packets comprise an operation point identifier identifying an operation point associated with a respective packet within the scalability space spanned by the scalability axis. By this measure, the packet operation point identifiers provide enough information to a network entity so as to associate these packets with their operation point in the scalability space provided the network entity has access to this scalability axes descriptor provided by the packet of the predetermined packet type. In effect, the technique allows for reducing the amount of data to be consumed for the majority of the packets as the operation point identifiers merely have to fulfill an identification task. The scalability axes descriptor may be transmitted less frequently. Concurrently, the network entity also has to perform the cumbersome task of parsing/reading the scalability axes descriptor less frequently, thereby reducing the overhead for the network entity. On the other hand, in accordance with an embodiment of the present invention, the network entity is able to interpret the operation point identifiers at least to the extent so as to distinguish packets of the lowermost operation point in the sequential operation point order, i.e. base layer packets, from other packets, i.e. packets belonging to operation points positioned higher in the sequential operation point order, i.e. "enhancement" layer packets.

In accordance with another aspect of the present invention which may be combined with a first one or may be implemented individually, it is a basic finding of the present invention that the handling of scalable data streams by network entities may be rendered more efficient if level and/or profile descriptors are conveyed using packets other than the data carrying packets, with profile and/or level descriptors being divided up into a first set explicitly signaling the definition of the available coding option set and/or available syntax element value range for a respective operation point, and a second set of profile and/or level descriptors which signal the definition of the available coding option set and/or available syntax element value range for their respective operation points by reference another profile and/or level descriptor. By this measure, the length of the whole sequence of profile and/or level descriptors is kept lower, thereby saving transmission overhead as well as parsing overhead.

BRIEF DESCRIPTION OF THE DRAWINGS

Embodiments of the present invention will be detailed subsequently referring to the appended drawings, in which:

FIG. 2 shows a schematic diagram of a scenario where a network entity receives a complete data stream;

FIG. 3a illustrates operation points within a two-dimensional scalability (e.g. temporal and spatial);

FIG. 3b illustrates a new_profile_level_flag concept;

FIG. 4 shows an NAL unit header syntax for HEVC;

FIG. 5 shows a VPS syntax;

FIG. 6 shows a vps_extension_data( ) syntax;

FIG. 11 shows an NAL unit syntax;

FIG. 12, including FIGS. 12a, 12b, and 12c, shows an SPS syntax;

FIG. 13 shows a VPS syntax; and

FIG. 14 shows a VPS extension data syntax.

DETAILED DESCRIPTION OF THE INVENTION

Figure 1A:
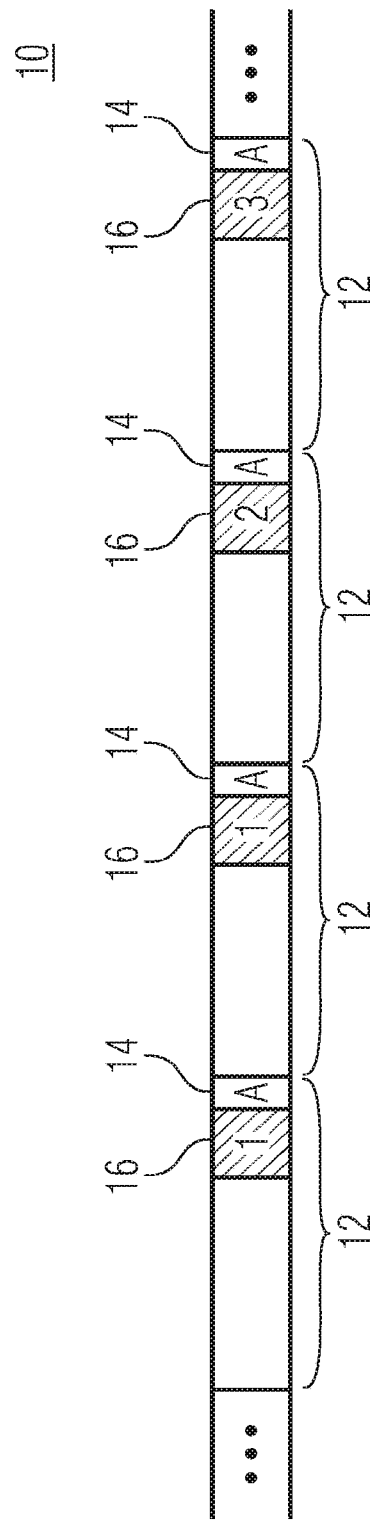
FIG. 1a shows a schematic of a data stream into which a media content is coded.

In order to ease the understanding of the embodiments outlined below, with respect to FIGS. 1 and 2 the specifics of scalable data streams and the problems in handling scalable data streams resulting from these specifics are described first. FIG. 1a illustrates a data stream 10 into which a media content is coded such as, for example, audio content, video content, picture content, 3D mesh content or the like. The media content may be time-varying with the data stream representing the media content in a sequence of time stamps such as picture of a video, transform blocks or frames of an audio signal or the like.

As shown in FIG. 1a, the data stream 10 comprises, or is composed of, packets 12. The packets may be equal in size or may differ in size. Each packet comprises a packet type identifier 14. Each packet type identifier 14 identifies a packet type associated with a respective packet 12, out of a plurality of packet types. The plurality of packet types comprises data carrying packet types. In FIG. 1a, for example, the packets within the portion of data stream 10 exemplarily shown in FIG. 1a is exemplarily shown to be of such a data carrying packet type, here exemplarily denoted as "A". Besides such data carrying packet types, there may be other packets of other packet types which do not carry data actually contributing to a coded representation of the media content, but other data such as, for example, supplementary data or information on the origin of the media content or the like.

At least each packet of a data carrying packet type such as A, comprises an operation point identifier 16 identifying an operation point associated with a respective packet, out of a plurality of operation points within a scalability space spanned by a number n of scalability axes, with 0>n, the operation points having a sequential operation point order defined thereamong. To render this clear, reference is made to FIG. 1b. The operation points are illustrated by circles 18. They are distributed or arranged within the scalability space 20 spanned by the scalability axes, wherein in FIG. 1b, for illustrative purposes, merely two such scalability spaces axes 22a and 22b are shown.

Figure 1B:
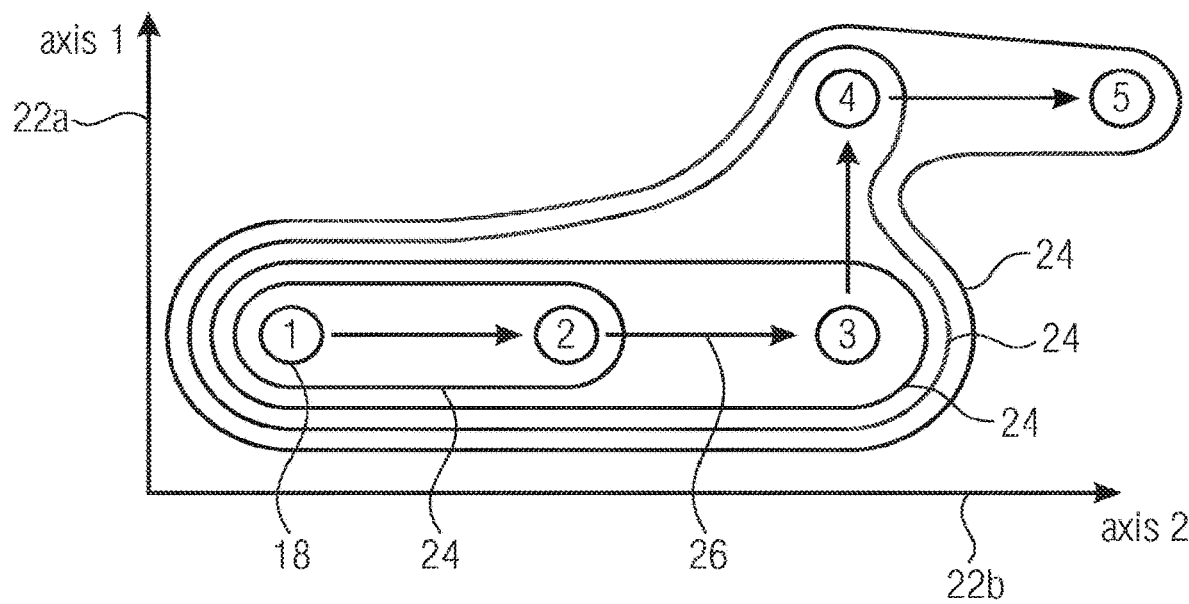
FIG. 1b schematically illustrates a composition of scalable data streams.

FIG. 1b illustrates the composition of scalable data streams such as scalable data stream 10. Packets 12, the operation point identifier of which identifies operation point 1, carry data which together form a coded representation of the media content at that operation point 1. Here, exemplarily, operation point 1 forms a kind of basic representation, i.e. a minimum amount of information concerning the media content is provided by the data of the packets of operation point 1. In case of a video, for example, the data of these packets represent a coded representation of the media content at low spatial resolution and lowest SNR, for example. By combining the data carried by packets belonging to operation point 1 with the data carried by packets 12 of operation point 2 as illustrated by loop line 24, the data thus derived results in a coded representation of the media content, the reconstruction of which somehow exceeds the representation obtained by reconstructed media content from the packets of operation point 1 only, such as for example in SNR or spatial resolution. The characteristic of the media content relating to which the coded representation is extended by adding the data of packets of operation point 2 to the data of the packets of operation point 1 is the semantic meaning of axis 2 in FIG. 1b and the scale of axis 22b is an ordinal scale which sorts the operation points 18 according to this semantic meaning.

In FIG. 1b, for example, axis 22b relates to the spatial resolution, while axis 22a relates to SNR quality. However, other semantic meanings of scalability axes may be available as well. For example, the additional data of packets of a further operation point may add information to the reconstructible version of the media content which was not available before, i.e. before adding this data, such as for example another view, another audio channel, a depth map or the like.

Accordingly, FIG. 1b likewise illustrates by further loop lines 24 that the basic coded representation of the media content may extend along axis 22b as well as along 22a. In other words, the addition of data of packets 12 of a certain operation point to data of packets of another operation point or a combination 24 of data of packets of other operation points leads to a new combination of data which, in accordance with one of the scalability axes 22a or 22b, exceeds the representation obtained without this addition, and this sequential effect is shown by the arrows 26, which accordingly form a sequential operation point order among the operation points 18, which leads through the scalability space 20.

Now, imagine that a network entity receives such a complete data stream. FIG. 2 shows such a scenario. The network entity is shown as a block 28 and is, for example, a decoder, or a MANE. In FIG. 2, network entity 28 receives a complete data stream 10, i.e. a data stream comprising all of the data packets including all data carrying data packets of all operation points. The network entity 28 has the task of providing a recipient 30 with a media content. In FIG. 2, network entity 28 is exemplarily to use a wireless transmission 32 to forward the media content to recipient 30. The network entity 28 is, for example, a mobility management entity. In such a scenario, the network entity 28 has to cope with time-varying transmission capacities to recipient 30. That is, there are time instances where the transmission capacity is not sufficient in order to transfer the complete data stream 10 to recipient 30 to be reproduced in real time, for example. Thus, network entity 28 has to "reduce" the data stream 10 so as to provide recipient 30 with a trimmed down version or representation of the media content. While, for example, the transmission capacity is insufficient in order to transmit the complete data stream 10, the transmission capacity may however be sufficient to transmit data stream 10 with packets 12 of operation point 5 being omitted, for example.

It should be noted that there are other scenarios as well where a network entity 28 has to drop some of the packets 12 in order to meet some externally driven constraints. Insofar, FIG. 2 merely serves as an example.

However, in order to perform the just mentioned task of reducing the data stream, network entity 28 has to inspect at least portions of the data stream. The portions to be inspected include the operation point identifiers 16. This puts a high burden onto network entity 28 and accordingly it would be favorable to keep this overhead low. The embodiments described next achieve this aim.

Another aspect which the embodiments described hereinafter deal with relates to the fact that the capabilities of a decoder allotted for decoding the data stream may increase while extending the sequential operation point order. Low level decoders, for example, may have lower capabilities, i.e. are of lower profile and/or lower level as explained in the introductory portion of the specification. Thus, the adding of some data of packets of a certain operation point may thus be restricted to decoders which meet some minimum profile and/or minimum level criterion and accordingly it would be favorable if network entities such as a decoder or some network entity forwarding the data stream to a decoder would be able to understand the profile and/or level requirements associated with the operation points 18 in a simple manner, but on the other hand with a low rate consumption.

Before starting the description of these embodiments, however, the following is noted. In particular, the nomenclature applied in the embodiments described next differs from the wording used in the description referring to FIG. 1a to 2. To be more specific, the embodiments described next represent specific implementations of embodiments of the present application tailored to be applied in the upcoming HEVC standard. Accordingly, the above mentioned packets are denoted below as NAL units, the NAL unit header of which comprises an operation point identifier which, in accordance with embodiments relating to a first aspect of the present application, are further specified by a scalability axes descriptor in a certain type of NAL unit, namely VPS NAL units. However, the specific embodiments described now are readily transferrable to other types of codecs. Insofar, the following embodiments shall be understood merely as illustrative.

Figure 1C:
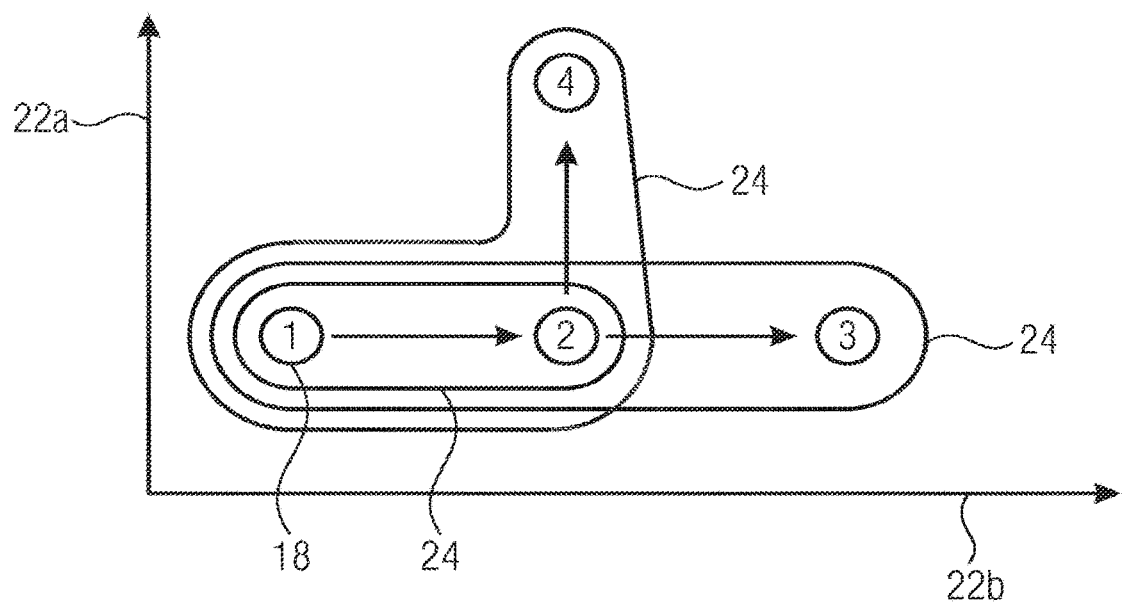
FIG. 1c schematically illustrates a composition of scalable data streams m accordance with another example.

Similarly, although FIG. 1b is suggestive of combinations 24 merely forming proper subsets to each other so that each combination is either a proper subset of all other combinations 24, one of a proper subset or a proper superset of the other combinations 24 or a superset of all other combinations 24 is optional. FIG. 1e, for example, shows a case where the sequentiality of the operation point 18, i.e. the property to have a sequential operation point order defined thereamong, is to be understood as encompassing cases where the combinations also comprise the case where one combination is neither a proper subset nor a proper superset of the other combination. In FIG. 1c, for example, the combination 24 resulting from adding the data of packets of operation point 4 to the data of the combination of packets of operation points 1 and 2 overlaps with the combination 24 resulting from adding the data of packets of operation point 1e to the combination of data of packets of operation points 1 and 2 merely partially, with the intersection being formed by the latter combination, i.e. the combination of operation points 1 and 2. Thereby, the sequential operation point order comprises a branch at operation point 2.

The following embodiment presents a high level syntax including an NAL unit header and a VPS syntax that allows for signaling of scalability information in a way to be useful in video decoders, video bitstream extractors or network devices for adaptation. The NAL unit header includes a scalability identifier that allows signaling up to three dimensions of scalability.

Before describing the VPS syntax in further detail, an overview is presented with respect to FIGS. 3a and 3b. The concepts may be used, for example, in the HEVC standard.

The new_profile_level_flag, present below, is used to signal that a certain operation point within the scalability dimensions of the video (e.g. temporal, spatial or any other) uses a different profile or level than the formerly described operation points. FIG. 3a shows the different operation points within a spatial and temporal scalable video sequence according to their scalable identifiers (temporal_id and layer_id). FIG. 3a illustrates operation points within two-dimensional scalability (e.g. temporal and spatial).

The Profile and Level needed to describe decoders capabilities in terms of supported coding tools, macroblock throughput and so on, might change with every operation point, which strongly depends on the scalability in use. In loops that signal profile and level or further parameters of operation points, the new_profile_level_flag is used to signal whether a new profile and level with respect to the formerly described operation points is present or to that the profile and level of a specific operation point has to be inherited from a formerly described ones by explicit reference.

Another aspect described below relates to an adaptable list of profile and level syntax elements. Profile, Level and optionally other parameters of operation points in parameter sets are given via while loops that allow for straight-forward adaptation, i.e. the exclusion or cut out of certain operation points as well as the adding thereof without changing other syntax elements within the given syntax, i.e. within the VPS. This is achieved by using the more_rbsp_data( ) syntax element that allows for a while loop which has no necessity for signaling the absolute number of layers and thereby easies the adaptation of parameter sets. FIG. 3b illustrates a new_profile_level_flag concept.

Another aspect described below relates to Layer scenarios. Layer scenario represents a ways in which to signal a interpretation of the five reserved bits in the second byte of the NAL unit header that may be used in HEVC extensions as scalable layer identifier layer_id in a scalable context.

In the layer scenario approaches, a scenario identifier is signaled in the NAL unit header that allows a decoder or MANE to interpret the five reserved bits as separate one- or many-dimensional identifier for video codings that feature one or multiple dimensions of scalability, such as temporal and spatial, spatial and multiview or others. A detailed description of the scalable dimension and the operation points within is given by means of the VPS, whereas the NAL unit header only provides information on how to interpret the five reserved bits of the NAL unit header syntax in order to derive one or more scalable identifiers.

The VPS syntax described next provides means to signal profile and level of each operation point and is designed to allow for straight-forward on-the-fly adaptation. The following sections give details on this syntax.

The proposed NAL unit header syntax is described first.

The second byte of the NAL unit header is used to signal a so called layer scenario (layer_scenario) and a scalability identifier (layer_id) that identifies an operation point in the context of the layer scenario.

FIG. 4 gives the NAL unit header syntax for HEVC with the new syntax elements layer_scenario and layer_id. The syntax element layer_scenario signals the scenario of scalability dimensions, for example, one scalability dimension for using only temporal scalability (e.g. temporal scalability as in the HEVC base specification) or combining two types of scalability (e.g. temporal and spatial). The syntax element layer_id describes the operation point of a specific NAL unit within the signaled scalability dimensions and has to be interpreted according to the layer_scenario syntax element.

In the case of no or one dimension of scalability, i.e. layer_scenario with a value of zero, the value of layer_id can be interpreted as an unsigned integer, listing the operation points in consecutive order according to their decoding dependencies and importance. In case of no scalability, all NAL units shall have a layer_id value of zero to signal that there is no meaningful hierarchical adaptation procedure and all NAL units are of the same importance.

With two dimensions of scalability, i.e. layer_scenario with a value of one, the value of layer_id can be interpreted as two 3-bit unsigned integer variables. The first three bits giving the operation point of the NAL unit in the first scalability dimension, e.g. temporal, and the second 3-bits give the operation point of the NAL unit in the second scalability dimension, e.g. spatial.

When layer_scenario has a value of two, the value of layer_id can be interpreted as a 2-bit unsigned integer variable giving the operation point in the first scalability dimension, followed by a 4-bit unsigned integer variable describing the operation point in the second scalability dimension. This scenario can be beneficial when the amount of layers of one dimension is larger than in the other dimension.

Given three dimensions of scalability, the corresponding value of layer_scenario is three, and the value of the layer_id syntax element can be interpreted as three 2-bit unsigned integer variables giving the operation point according to the three scalability dimensions in use, e.g. temporal, spatial and multiview scalability.

Table 2 gives an overview on the values of layer_scenario and presents the corresponding interpretation of layer_id.

TABLE 2

Overview of layer_scenario values.

| layer_scenario | Number of scalability dimensions | interpretation of layer_id | number of possible operation points per dimension |
|---|---|---|---|
| 0 | 0-1 | one 6-bit unsigned integer | 64 |
| 1 | 2 | two 3-bit unsigned integer | 8 |
| 2 | 2 | one 2-bit and one 4-bit unsigned integer | 4 (first dimension) and 16 (second dimension) |
| 3 | 3 | three 2-bit unsigned integer | 4 |

The corresponding video parameter set syntax is described next.

The syntax of the Video Parameter Set has to be adjusted in order to signal profile and level for each operation point in the possibly three dimensional scalability space and provide means to adapt it in a straight-forward way to reflect the current level of adaptation of the video bitstream. This is achieved by using the vps_extension_data( ) syntax element for profile and level signaling of NAL units that use any kind of scalability, e.g. temporal, spatial or others. Furthermore, it provides detailed information for the interpretation of the layer_id syntax element within the NAL unit header.

The VPS syntax given is given in FIG. 5.

FIG. 5 signals profile and level for NAL units that do not use any kind of scalability, i.e. video data coded according to the HEVC base specification with the lowest temporal level.

Furthermore, the syntax element layer_id_type is given in order to allow a more detailed understanding of the scalability dimensions described with the layer_id syntax element within the NAL unit header syntax. Table 1e specifies the actual scalability dimensions signaled in layer_id for the layer_id_type syntax element. For the HEVC base specification, only temporal scalability has to be defined. Future HEVC scalability extension would consequently specify further layer_id_type values for their specific needs, e.g. 1: temporal scalability, 2: spatial scalability for an SVC-like extension of HEVC.

This allows any device in possession of the VPS to completely interpret the operation point of a NAL unit within the known scalability dimensions, whereas devices that do not have access to the VPS can still perform correct adaptation of the video bitstream but without knowledge of the actual scalability dimensions.

TABLE 3 layer_id_type and detailed description of scalability dimension in layer_id

| layer_id_type | Scalability dimensions |
|---|---|
| 0 | none |
| 1 | 1: temporal scalability |
| 1 ... 127 | Unspecified |

Descriptions of operation points that use scalability in any dimensions (e.g. temporal level>0, spatial scalability . . . ) are given by means of the vps_extension_data( ) syntax as given in FIG. 6. Each operation point is identified via its layer_id. The new_profile_level_flag allows for either explicit signaling of profile and level of the described operation or implicit signaling by referencing another operation point description by its layer_id using the syntax element ref_layer.

Using the vps_extension_data( ) syntax allows for adaptation in a straight-forward way, as operation points are explicitly referenced and can be omitted by excluding a fixed number of bytes. Whenever the omitted vps_extension_data( ) syntax is not referenced by other operation point description, no bits of the VPS have to be changed apart from the omitted ones, which simplifies on-the-fly adaptation considerably.

Figure 7:
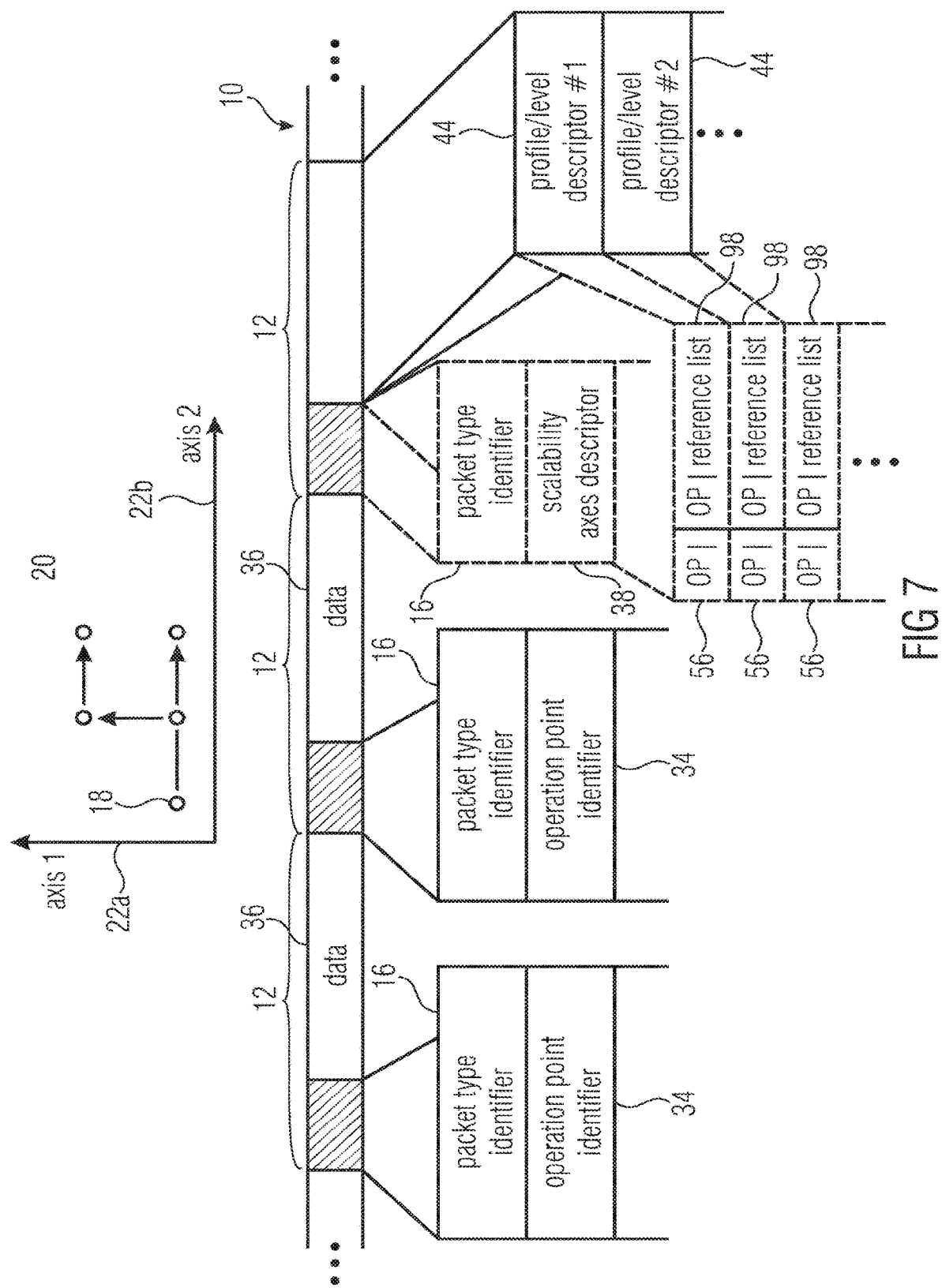
FIG. 7 shows a schematic diagram of a data stream m accordance with an example.

Thus, using the nomenclature applied with respect to FIGS. 1a to 1c, the just outlined specific embodiments describe a data stream composed as depicted in FIG. 7. The data stream which is generally indicated using reference sign 10 has a media content coded thereinto such as, as denoted above, audio, video or other media content. The data stream 10 comprises packets 12 called NAL units. Each packet 12 comprises a packet type identifier, namely nal_unit_type, identifying a packet type associated with a respective packet 12 out of a plurality of packet types. Each packet 12 having a packet type out of a first set of the plurality of packet types associated therewith such as all NAL units, comprises an operation point identifier 34, namely the combination of layer_scenario and layer_id, identifying an operation point 18 associated with the respective packet 12, out of a plurality of operation points 18 within the scalability space 20 spanned by a number n of scalability axes 22a, b with 0>n, the operation points 18 having a sequential operation point order defined thereamong. In this regard, it should be noted that not necessarily each NAL unit or packet 12 has an operation point identifier 34. Rather, there may be packets 12 of a certain packet type, which are of general nature as far as the operation points are concerned and accordingly do not comprise any operation point identifier.

In the embodiment of FIG. 7, however, each packet 12 having a packet type out of a second set of the packet types associated therewith, namely the non-VPS NAL units, additionally carries data 36 contributing to a coded representation of the media content at the operation point 18 associated with a respective packet along with packets 12 having any operation point associated therewith which precedes the operation point associated with the respective packet, or equals the operation point associated with the respective packet in accordance with the sequential operation point order. Reference is made to the description of FIG. 1b and FIG. 1c for details in this regard.

Each packet having a predetermined packet type disjoint to the second set of packet types associated therewith, has a scalability axes descriptor 38 defining the number n and a semantic meaning of the one or more scalability axes with the scalability axes descriptor 38 being represented by layer_id_type occurring in the VPS NAL units, i.e. NAL units 12 where the rbsp data portion 40 is filled according to the VPS syntax 42.

As also described above, each VPS packet may also comprise a sequence of profile and/or level descriptors 44, namely vps_extension_data, individually associated with at least a subset of the plurality of operation points 18 such as, for example, the leading ones in terms of the sequential operation point order. Each profile and/or level descriptor 44 defines an available coding option set, i.e. a minimum profile to be supported for reconstruction purposes and/or an available syntax element value range, i.e. a minimum level necessitated for reconstruction, which a syntax of packets 12 having the operation point associated with the respective profile and/or level descriptor 44, associated therewith, obey. In other words, the combination of data resulting from adding the data of packets of a certain operation point 18 to data of packets associated with one or a combination of other operation points 18, is reconstructible only for decoders which support the respective profile and/or level.

A first set of the profile and/or level descriptors 44 explicitly signal the definition of the available coding option set and/or available syntax element value range, namely those for which the syntax element new_profile_level_flag, i.e. flag 46, equals 1. A second, disjoint non-empty set of the profile and/or level descriptors 44 signal the definition of the available coding option set and/or available syntax element value range by referencing another preceding profile and/or level descriptor 44, namely those for which new_profile_level_flag equals 0. In FIG. 6 the explicit signaling of profile is done using syntax element profile_idc at 48, while syntax element level_idc represents a level indicator 50. The referencing to another profile and/or level descriptor 44 in case of new_profile_level_flag=0, is done using a syntax element ref_layer_id 52. Obviously, the use of referencing profile and/or level descriptors 44 reduces the size necessitated for transmitting the sequence 54 of profile and/or level descriptors, and this aspect may, as further outlined below, be exploited independent from the co-use of the operation point identifier 34 and the scalability axes descriptor 38.

While the sequence 54 of profile and/or level descriptors 44 may be sequentially associated in the sequential operation point order with the at least subset of plurality of operation points, this is not necessarily the case. Rather, each profile and/or level descriptor may have a field 56, namely layer_id, which identifies the operation point 18 the respective profile and/or level descriptor 44 is associated with. The network entity which deals with the data stream 10 may ascertain the sequential operation point order defined among the operation points 18 from the order of the fields of the profile and/or level descriptors 44 in sequence 54. Alternatively, however, the sequential operation point order may be known to the network entity by default depending on, for example, the scalability axes descriptor. To be even more precise, the order of the operation points identified by the fields 56 and the sequence of the profile and/or level descriptors 44 may be used by a network entity such as network entity 28 of FIG. 2, so as to derive the sequential operation point order.

Figure 8:
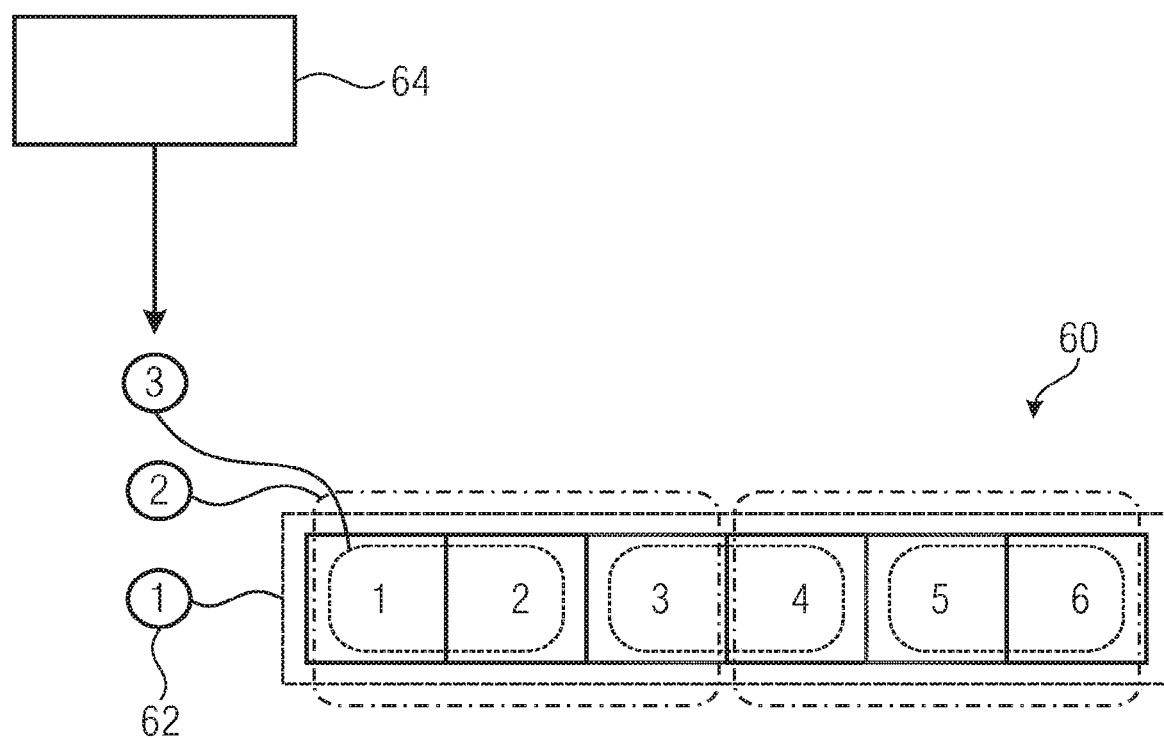
FIG. 8 shows a flow diagram for an example for partitioning the fixed-bit-length syntax element or bit sequence, respectively.

The field 56 may identify the respective operation points using a bit sequence which is common to the operation point identifiers 34. In the embodiment outlined below, for example, all operation point identifiers 34 had a fixed-bit-length syntax element, namely layer_id, and a scenario syntax element, namely layer_scenario, where the scenario syntax element signaling n and an association of n partitions of the fixed-bit-length syntax element with the n scalability axes, the fixed-bit-length syntax element is common to, or equally constructed to, the bit sequence of fields 56. FIG. 8 illustratively shows an example for partitioning the fixed-bit-length syntax element or bit sequence 60 of fields 56 or fixed-bit-length syntax element of the operation point identifier 34 into a different number of partitions in accordance with three different states 62 of the scenario syntax element 64 with the partitions exemplarily shown with a dashed line for a first state, a dash-dot line for a second state and dotted lines for a third state. That is, a network entity interpreting the fixed-bit-length syntax element or bit sequence 60 may identify the correct operation point identified by the respective fixed-bit-length syntax element or bit sequence 60 by using the bits contained in the individual partitions as components in the n-dimensional scalability space 20.

In the embodiment described below, the bit sequence used for the syntax element ref_layer_id 52 uses the same bit sequence as shown in FIG. 8. Alternatively, a relative pointer defined in units of ranking positions in the sequential operation point order may have been used. For example, the network entity may merely add ref_layer_id bit-wise to syntax element layer_id 56 so as to access or obtain the layer_id of the operation point which the current profile and/or level descriptor 44 refers to so as to adopt the profile identifier and/or level identifier profile_idc and/or level_idc 48 and/or 50 for the current operation point.

In the embodiment described above, the scalability axes descriptor 38, namely layer_id_type, forms a syntax element, the possible states of which are individually associated with different combinations of values for n and the corresponding semantic meaning of the n scalability axis. That is, possible states of the scalability axes descriptor are individually mapped to different (n) meaning (1), . . . , meaning (n) (wherein reference is made to table 3). That is, using the scalability axes descriptor 38, a network entity reading the data stream knows about the semantics of meaning of the property for which the values within the partitions in FIG. 8 are in ordinal measure. A network entity which, however, has not yet had an opportunity to successfully read a VCL NAL unit, may however at least rely on the ordinal characteristic of the values in the partitions of bit sequence 60 of operation point identifiers 34 as obtained using the partitioning according to the scenario syntax element 64, so as to decide on possible reductions of the data stream in processing the data stream.

Before proceeding to the next specifically outlined embodiment, it is noted that in accordance with the above mentioned further aspects of the present application, the scalability axes descriptor 38 could be omitted with the semantics thereof being included, for example, in the operation point identifiers 34, which would however accordingly have to consume more bits than compared to the embodiments described right now. Nevertheless, however, such alternative embodiments would still be advantageous in that the above described sequence 54 of profile and/or level descriptors 44 is present, which involves both explicitly signaling profile and/or level descriptors 44 as well as indirectly signaling/referencing profile and/or level descriptors 44.

With regard to the description above, however, it should be noted that various modifications could be performed onto the embodiments outlined above. For example, the number of bits chosen in the above example for the fixed-length-syntax element or bit sequence 60, namely 6, could be changed to be greater or smaller. A similar note is valid as far as the possible scalability axes number n adjustable by scenario syntax element 64 is concerned: the set of possible states was (1, 2, 3), but a different set of possible integers for n could be realized as well.

Figure 9:
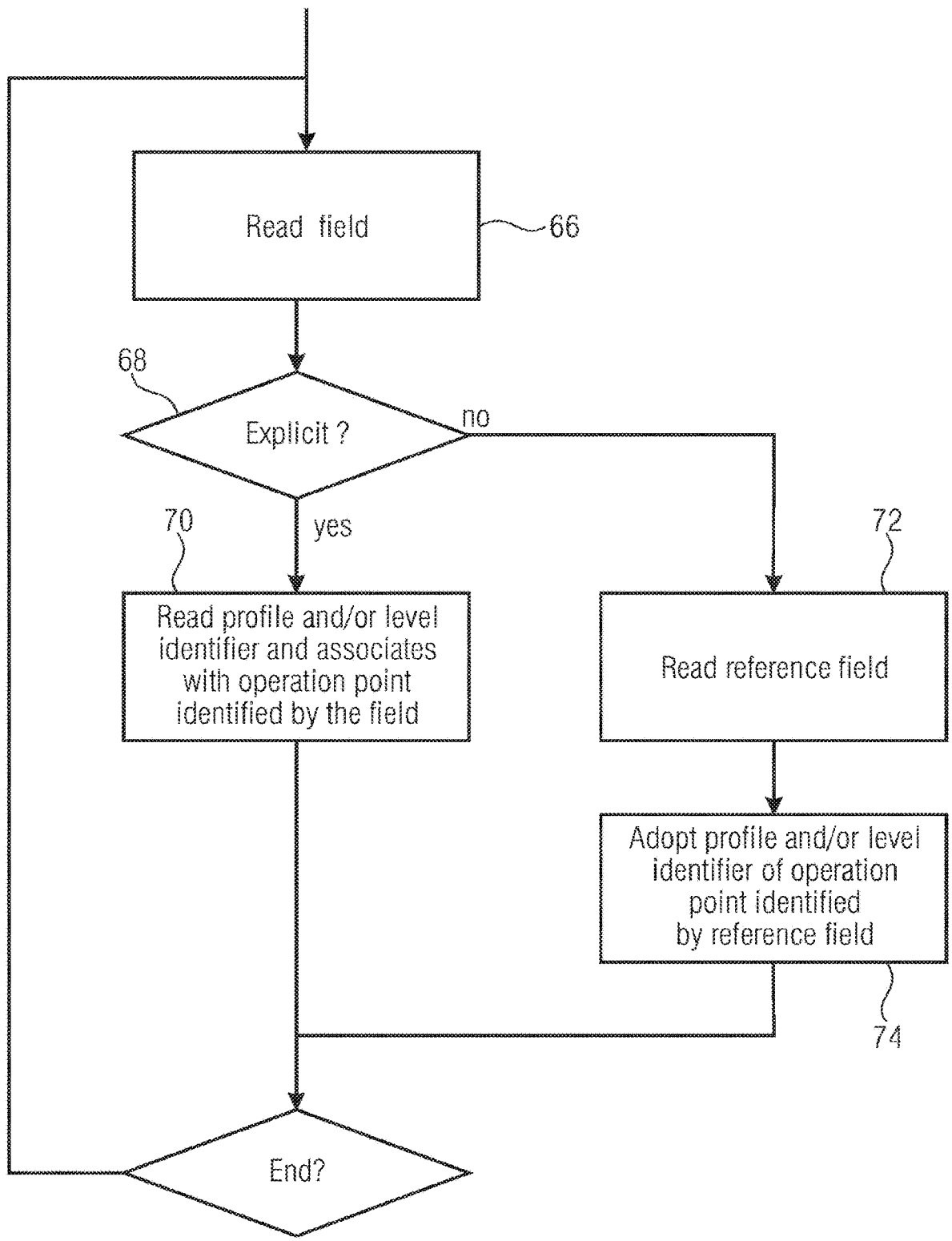
FIG. 9 shows a flow diagram for a mode of operation of an exemplary network.

For the sake of completeness only, FIG. 9 shows the mode of operation of a network entity which for example reads the sequence of profile and/or level descriptors 44. First of all, the field of the first profile and/or level descriptor 44 in list 54 is read at step 66. Then, the network entity checks at step 68 whether the current profile and/or level descriptor 44, the field of which was read in step 66, explicitly signals profile and/or level or indirectly signals the same. In accordance with the embodiment above, step 68 involves reading syntax element reserved_zero_one_bit with the actual decision being dependent on the value of the syntax element: explicit signaling is indicated by new_profile_level_flag being equal to 1, and the indirect signaling by the syntax element being equal to 0.

In case of the explicit signaling, the network entity reads in step 70 the profile and/or level identifier 58/50 and associates same with the operation point identified by the field read in step 66. In case of indirect signaling, however, the network entity reads in step 72 from the data stream the reference field 52 and adopts in step 74 the profile and/or level identifier associated with the operation point identified by this reference field 52 as the profile and/or level identifier of the operation point identified by the field read in step 66. These steps are then repeated until the sequence of profile and/or level descriptors 44 has been scanned through.

Figure 10:
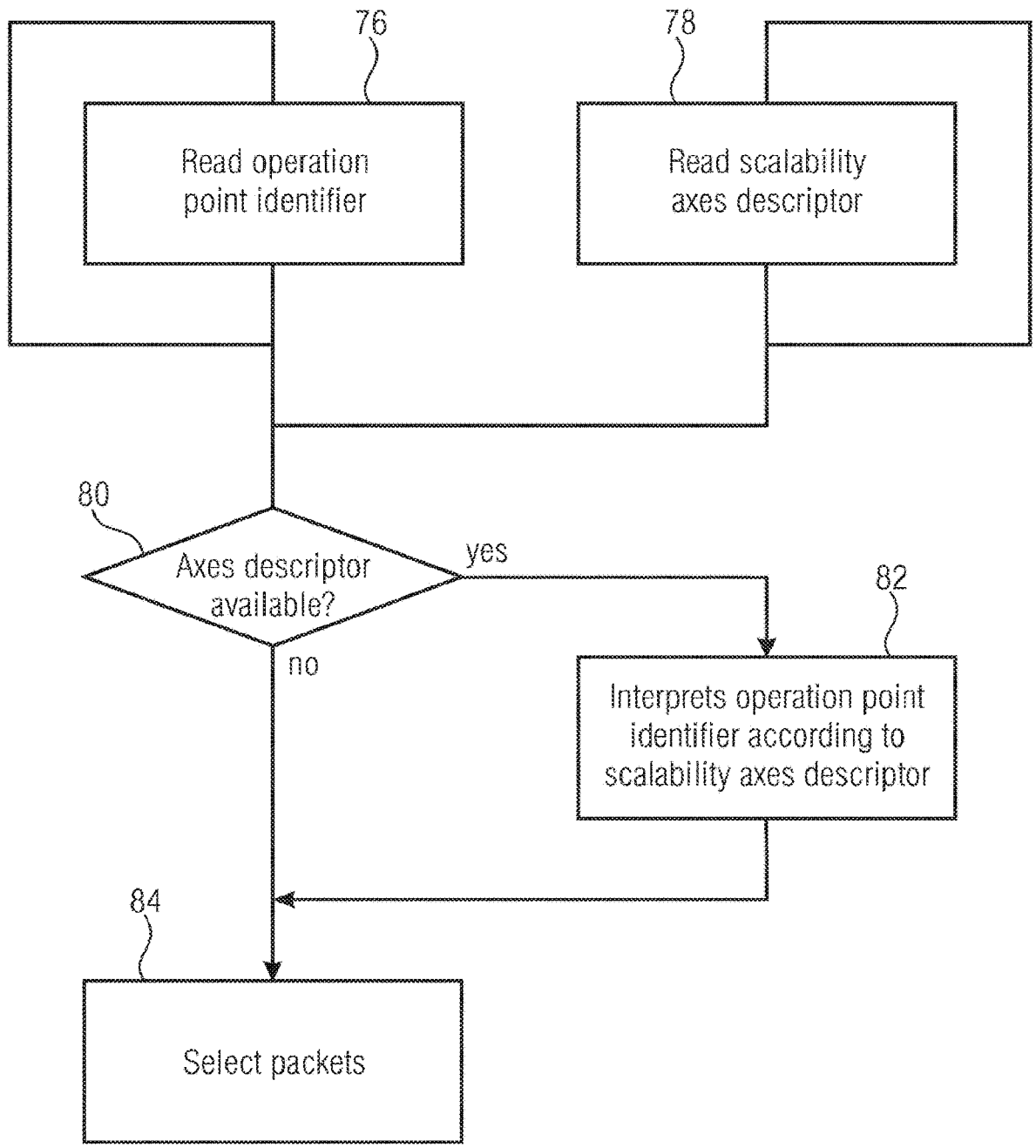
FIG. 10 shows another mode of operation of a network entity.

Similarly, FIG. 10 illustrates the mode of operation of a network entity which takes advantage of those embodiments described above, where the scalability axes descriptor 38 completes the information provided by the operation point identifiers 34 in the individual packets. As shown in FIG. 10, first of all the operation point identifier of a current packet is read in step 76. This is done for all packets 12. Further, the network entity inspects the VPS NAL units so as to read therefrom in step 78 the scalability axes descriptor. Both steps 76 and 78 are performed each time a respective packet of the respective packet type is encountered by the network entity. Each time an operation point identifier is read at step 76, the network entity distinguishes in step 80 between the case where the scalability axes descriptor has not yet been read, thereby not being available, or has already been read thereby being available. In case of the availability, the network entity interprets the operation point identifier of the current packet according to the scalability axes descriptor read in step 78 in step 82. After interpretation, the network entity knows about the meaning of the scalability axis and may act accordingly. In particular, irrespective of the availability or non-availability, the network entity selects packets out of packets 12 in step 84 such as selecting those packets which are to be decoded or to be forwarded to a recipient such as a recipient 30. The step 84 may be dependent on external data such as, for example, data indicating the recipient's capability of reproducing media data, such as maximum reproducible spatial resolution, maximum pixel bit depth of the display and so forth. In case the interpretation is not available due to the non-availability of the scalability axes descriptor, network entity 28 may be configured to act defensively by for example merely further processing the packets belonging to the lowest operation point in accordance with the sequential operation point order.

Again, the network entity 28 may be a decoder, a transcoder, a media aware network entity such as a mobility management entity or the like.

Moreover, an entity which generates any of the embodiments for a data stream described above, such as an encoder of the like, may be configured to intersperse the VPS NAL units in between the data carrying packets sufficiently frequently so as to keep the time durations low where a network entity faces the non-availability problems occurring if the scalability axes descriptor is not yet available as described with respect to FIG. 10.

For a network entity, which reads the sequence of profile and/or level identifiers 44, it is noted that such a network entity may be configured to in addition to the process of FIG. 10, or alternatively thereto, render a selection among the packets 12 based on the availability coding option set and/or available syntax element value range associated with the individual operating points: for example, the network entity may exclude operation points the necessitated profile and/or level of which exceeds the maximum profile and/or maximum level of itself in case of the network entity being a decoder, for example or of the recipient with which the network entity is communicating, in case of the network entity being, for example, an MME.

In other words, what has been described with respect to FIG. 4 to 6 is a datastream into which a media content is coded, the datastream comprising packets (c.p. NAL units), each packet comprising an packet type identifier nal_unit_type identifying a packet type associated with the respective packet, out of a plurality of packet types, wherein each packet having a packet type out of a first set of the plurality of packet types associated therewith (e.g. all NAL units), comprises an operation point identifier layer_scenario and layer_id identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith (e.g. non-VPS NAL units), additionally carries data contributing to a coded representation of the media content at the operation point associated with the respective packet along with the packets having any operation point associated therewith which precedes the operation point associated with the respective packet, or equals the operation point associated with the respective packet, wherein each packet (c.p. VPS NAL units) having a predetermined packet type disjoint to (i.e. external to) the second set associated therewith, has an scalability axes descriptor (c.p. layer_id_type) defining the number of the one or more scalability axes and a semantic meaning thereof.

Another example of the datastream, wherein each of the packets having the predetermined packet type associated therewith, also comprises a sequence of profile and/or level descriptors vps_extension_data individually associated with at least a subset (e.g. the leading ones, in terms of the sequential operation point order) of the plurality of operation points, each profile and/or level descriptor defining an available coding option set (c.p. profile) and/or an available syntax element value range (c.p. level) which a syntax of packets having the operation point associated with the respective profile and/or level descriptor, associated therewith, obey, wherein a first set of the profile and/or level descriptors explicitly signal the definition of the available coding option set and/or available syntax element value range, (c.p. new_profile_level_flag=1) and a second, disjoint non-empty set of the profile and/or level descriptors signal the definition of the available coding option set and/or available syntax element value range by referencing another, preceding profile and/or level descriptor (c.p. new_profile_level_flag=1).

In another example of the datastream, the sequence of profile and/or level descriptors is sequentially associated, in the sequential operation point order, with the at least subset (e.g. the leading ones, in terms of the sequential operation point order) of the plurality of operation points.

In another example of the datastream, each profile and/or level descriptor has a field (c.p. layer_id) identifying the operation point the respective profile and/or level descriptor is associated with (i.e. along with 4), the sequential operation point order is derivable from the sequence of profile and/or level descriptors.

In another example of the datastream, in each profile and/or level descriptor, the field identifies the operation point the respective profile and/or level descriptor is associated with, using a bitsequence common to the operation point identifiers identifying the operation point the respective profile and/or level descriptor is associated with.

In another example of the datastream, all operation point identifiers have a fixed-bit-length syntax element (c.p. layer_id) and a scenario syntax element (c.p. layer_scenario), the scenario syntax element signaling n and an association (but without semantic meaning) of n partitions of the fixed-bit-length syntax element with the n scalability axes, wherein the bitsequence is common to the fixed-bit-length syntax element.

In another example of the datastream, the second, disjoint non-empty set of the profile and/or level descriptors signal the definition of the available coding option set and/or available syntax element value range by referencing another, preceding profile and/or level descriptor using an explicit signaling of the field of the referenced profile and/or level descriptor, or using a relative pointer defined in units of ranking positions in the sequential operation point order (with the second alternative being an alternative to above description).

According to a further aspect of the datastream, all operation point identifiers have a fixed-bit-length syntax element and a scenario syntax element, the scenario syntax element signaling n and an association of n partitions of the fixed-bit-length syntax element with the n scalability axes so that the n-th portion is a ordinal measure of a position of the respective operation point along then-th scalability axis.

According to another aspect of the datastream, the scalability axes descriptor (c.p. layer_id_type) comprises a syntax element the possible states of which are individually associated with different combinations of values for n and semantic meaning of the corresponding semantic meaning of the n scalability axes (i.e. a function maps {n,meaning(1), . . . , meaning(n)} to {1 . . . max. possible state of layer_id_type}).

In another datastream into which a media content is coded, the datastream comprises packets, each packet comprising an packet type identifier identifying a packet type associated with the respective packet, out of a plurality of packet types, wherein each packet having a packet type out of a first set of the plurality of packet types associated therewith, comprises an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or is equals the operation point associated with the respective packet, wherein each packet having a predetermined packet type disjoint to (external to) the second set associated therewith, comprises a sequence of profile and/or level descriptors individually associated with at least a subset (e.g. the leading ones, in terms of the sequential operation point order) of the plurality of operation points, each profile and/or level descriptor defining an available coding option set and/or an available syntax element value range which a syntax of packets having the operation point associated with the respective profile and/or level descriptor, associated therewith, obey, wherein a first set of the profile and/or level descriptors explicitly signal the definition of the available coding option set and/or available syntax element value range, and a second, disjoint non-empty set of the profile and/or level descriptors signal the definition of the available coding option set and/or available syntax element value range by referencing another, preceding profile and/or level descriptor.

In another example of the datastream, the sequence of profile and/or level descriptors is sequentially associated, in the sequential operation point order, with the at least subset (e.g. the leading ones, in terms of the sequential operation point order) of the plurality of operation points.

In another example of the datastream, each profile and/or level descriptor has a field identifying the operation point the respective profile and/or level descriptor is associated with.

In another example of the datastream, in each profile and/or level descriptor, the field identifies the operation point the respective profile and/or level descriptor is associated with, using a bitsequence common to the operation point identifiers identifying the operation point the respective profile and/or level descriptor is associated with.

In another example of the datastream, all operation point identifiers have a fixed-bit-length syntax element and a scenario syntax element, the scenario syntax element signaling n and an association of n partitions of the fixed-bit-length syntax element with the n scalability axes, wherein the bitsequence is common to the fixed-bit-length syntax element.

In another example of the datastream, the second, disjoint non-empty set of the profile and/or level descriptors signal the definition of the available coding option set and/or available syntax element value range by referencing another, preceding profile and/or level descriptor using an explicit signaling of the field of the referenced profile and/or level descriptor, or using a relative pointer defined in units of ranking positions in the sequential operation point order.

In another example of the datastream, all operation point identifiers have a flag signaling as to whether same belongs to the first set of the profile and/or level descriptors explicitly signaling the definition of the available coding option set and/or available syntax element value range, and the second, disjoint non-empty set of the profile and/or level descriptors signaling the definition of the available coding option set and/or available syntax element value range by referencing another, preceding profile and/or level descriptor.

Another aspect may have a network entity (e.g., decoder or MANE) for processing a datastream into which a media content is coded, the datastream comprising packets, each packet comprising an packet type identifier identifying a packet type associated with the respective packet, out of a plurality of packet types, wherein each packet having a packet type out of a first set of the plurality of packet types associated therewith, comprises an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or equals the operation point associated with the respective packet, wherein the network entity is configure to read from a packet having a predetermined packet type disjoint to (i.e. external to) the second set associated therewith, a scalability axes descriptor defining the number of the one or more scalability axes and a semantic meaning thereof, and interpret the operation point identifiers depending on the scalability axes descriptor.

In another example, the network entity is configured to read from the packet having the predetermined packet type disjoint to (external to) the second set associated therewith, a sequence of profile and/or level descriptors individually associated with at least a subset (e.g. the leading ones, in terms of the sequential operation point order) of the plurality of operation points, each profile and/or level descriptor defining an available coding option set and/or an available syntax element value range which a syntax of packets having the operation point associated with the respective profile and/or level descriptor, associated therewith, obey, wherein the network entity is configure to, responsive to a signaling in the datastream, explicitly read from a first set of the profile and/or level descriptors the definition of the available coding option set and/or available syntax element value range, and read, for a second, disjoint non-empty set of the profile and/or level descriptors, a reference to another, preceding profile and/or level descriptor and derive the definition of the available coding option set and/or available syntax element value range of the second, disjoint non-empty set of the profile and/or level descriptors from the respective referenced preceding profile and/or level descriptor.

In another example of the network entity, the sequence of profile and/or level descriptors is sequentially associated, in the sequential operation point order, with the at least subset (e.g. the leading ones, in terms of the sequential operation point order) of the plurality of operation points.

In another example of the network entity, each profile and/or level descriptor has a field identifying the operation point the respective profile and/or level descriptor is associated with.

In another example of the network entity, in each profile and/or level descriptor, the field identifies the operation point the respective profile and/or level descriptor is associated with, using a bitsequence common to the operation point identifiers identifying the operation point the respective profile and/or level descriptor is associated with.

In another example of the network entity, all operation point identifiers have a fixed-bit-length syntax element and a scenario syntax element, the scenario syntax element signaling n and an association of n partitions of the fixed-bit-length syntax element with the n scalability axes, wherein the bitsequence is common to the fixed-bit-length syntax element.

In another example of the network entity, the second, disjoint non-empty set of the profile and/or level descriptors signal the definition of the available coding option set and/or available syntax element value range by referencing another, preceding profile and/or level descriptor using an explicit signaling of the field of the referenced profile and/or level descriptor, or using a relative pointer defined in units of ranking positions in the sequential operation point order.

In another example of the network entity, all operation point identifiers have a fixed-bit-length syntax element and a scenario syntax element, wherein the network entity is configure to use the scenario syntax element to determine n and associate n partitions of the fixed-bit-length syntax element with the n scalability axes so that the n-th portion is a ordinal measure of a position of the respective operation point along the n-th scalability axis.

In another example, the network entity is configured to render a selection among the packets having any packet type out of the first set of the plurality of packet types associated therewith based on the interpretation.

Another example may have a network entity (e.g., decoder or MANE) for processing a datastream into which a media content is coded, the datastream comprising packets, each packet comprising an packet type identifier identifying a packet type associated with the respective packet, out of a plurality of packet types, wherein each packet having a packet type out of a first set of the plurality of packet types associated therewith, comprises an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or is equals the operation point associated with the respective packet, wherein the network entity is configure to read from a packet having a predetermined packet type disjoint to (external to) the second set associated therewith, a sequence of profile and/or level descriptors sequentially associated, in the sequential operation point order, with at least a subset (the leading ones, in terms of the sequential operation point order) of the plurality of operation points, each profile and/or level descriptor defining an available coding option set and/or an available syntax element value range which a syntax of packets having the operation point associated with the respective profile and/or level descriptor, associated therewith, obey, wherein the network entity is configure to, responsive to a signaling in the datastream, explicitly read from a first set of the profile and/or level descriptors the definition of the available coding option set and/or available syntax element value range, and read, for a second, disjoint non-empty set of the profile and/or level descriptors, a reference to another, preceding profile and/or level descriptor and derive the definition of the available coding option set and/or available syntax element value range of the second, disjoint non-empty set of the profile and/or level descriptors from the respective referenced preceding profile and/or level descriptor.

In another example, the network entity is configured to render a selection among the packets having any packet type out of the first set of the plurality of packet types associated therewith based on the associated available coding option set and/or an available syntax element value range.

The description of the next embodiment starts with a further introduction which would be, however, also transferrable to the embodiments described so far.

Besides recording, storing and playout of video, the transmission thereof is a major application in today's communication networks. The unsteady nature of specific communication channels necessitates means of adaptation to be provided by the high level syntax of HEVC to perform well in different environments. Straight-forward adaptation of video bitstreams within the network during transmission, e.g. by Media-Aware Network Elements (MANEs), is one of the major challenges. Such devices usually only have limited resources in terms or processing power and have to operate with very low delay which prevents in-depth bitstream analysis.

The demands of this setup were already identified within the standardization of H.264/AVC. The encapsulation of video data into Network Abstraction Layer (NAL) units and the design decision to signal many important but rather invariant parameters outside the video bitstream in so called Parameter Sets reflect this understanding. A lack of extensibility of the base specification of H.264/AVC led to complicated approaches to extend the H.264/AVC high level syntax in a backwards-compatible way when extensions were specified. For HEVC, a flexible and extensible high level syntax should be taken care of in the base specification. Therefore, the high level syntax has to provide devices, such as MANEs, with the necessitated information in an accessible form, e.g. not entropy decoded, and suitable for signaling adaptation in a straight-forward way.

The below takes on the concept of a Video Parameter Set (VPS) as defined in the current draft specification to provide information necessitated for adaptation of the video bitstream, such as operation point descriptions and coding dependencies. It combines the information that in H.264 and its extensions is distributed across the layer specific sequence parameters sets (SPSs) and sits on top of the SPSs in the parameter set hierarchy.

The current definition of the VPS in the HEVC draft base specification defines the VPS to hold only redundant copies of some syntax related to sub-level demands for temporal scalability that are located in the SPS in H.264 and its extensions. Hence, the VPS is not necessitated for the decoding of the coded video sequence. In accordance with the embodiment below, however, redundant signaling is omitted and the syntax element is kept in the VPS only. Furthermore, in accordance with the embodiment below, however, the profile, level and sub-level demands signaling is changed in a way that its inherent hierarchy is reflected in their position within the hierarchy of parameters sets (VPS, SPS, and PPS). This means that the most basic and fundamental parameters for bitstream adaptation and capability exchange, i.e. profile and level information, are provided top of the parameter set hierarchy, namely the VPS, whereas less important sub-level demands, i.e. sps_max_latency_increase[i], vps_num_reorder_pics[i], vps_max_dec_pic_buffering[i] are signaled in the SPS as in former versions of the draft specification. In this way, we will make most important information available to MANEs in a straightforward way without the necessity to compile information from several SPSs. Applications that rely on lower level demands, such as sub-level demands for temporal scalability, can still find the desired information in an uncompiled form in lower steps of the parameter set hierarchy. Generally speaking, a non-application specific MANE is hardly interested in such low level capabilities information of end devices. Profile and level demands are expected to be fine-grained enough for most application and comer-case application can still retrieve this information from the lower-level parameter sets.

A VPS defined in this way allows a MANE to be fully aware of the scalability dimensions and profile and level associated with every operation point. Operation points within the scalability dimensions with redundant profile and level identifiers can be signaled by reference to decrease redundant signaling. Utilizing the VPS extension data syntax to signal individual operation point descriptions allows for straight-forward modular structure that can easily be constructed by an encoder.

A SEI message is proposed to make MANEs and receivers aware of possibly adapted video sequences, where not all the operation points described in the VPS and its extensions are present. Allowing MANEs to be aware of the actual (adapted) content of the video sequence is of importance to facilitate further adaptation, e.g. in a cascaded adaptation process with multiple MANEs.

In order to generically signal the operation point of a NAL unit within the occurring scalability dimensions on the NAL unit header level, the reserved bits in the second byte of the NAL unit header are used to signal a layer identifier to identify enhancement layers or views from the base layer or view. The information necessitated to interpret the layer identifier of a NAL unit in terms of the scalability dimensions of the coded video sequence is provided by means of the VPS. This signaling includes the type of scalability and information on how the individual bits of the layer identifier correspond to applicable scalability dimensions. This allows a MANE or any other device to correctly build a possibly multi-dimensional (temporal, quality, spatial, multiview, depth . . . ) scalability operation point matrix from the information provided in the NAL unit header and the VPS.

The NAL unit syntax of the embodiment described now is shown in FIG. 11 where layer_id_plus 1 minus 1 indicates the layer identification. A layer_id_plus 1 equal to 1 indicates that the layer identification is equal to 0, and the NAL unit belongs to the base layer or base view. Higher values of layer_id_plus1 indicate that the corresponding NAL unit belongs to an enhancement layer or view associated with the specified layer_id_plus 1.

The corresponding SPS syntax is shown in FIG. 12 and the corresponding VPS syntax in FIG. 13, where: scalability_type indicates the scalability types in use in the coded video sequence and the dimensions signaled through layer_id_plus1 in the NAL unit header. When scalability_type is equal to 0, the coded video sequence conforms to the base HEVC specification, thus layer_id_plus1 of all NAL units is equal to 1 and there are no NAL units belonging to an enhancement layer or view. Higher values of scalability_type have to be interpreted according to Table 4.

profile_space, profile_idc, constraint_flags, and profile_compatability_flag signal information as specified in the current WD and the indicated values are valid for all NAL units with a layer_id_plus 1 equal to 1.

level_idc[i] signals information as specified in the current WD and the indicated values are valid for all NAL units with a layer_id_plus1 equal to 1 and a temporal_id equal to i.

layer_id_plus 1_dim_len [dim] indicates the length in bits of layer_id_plus 1 that is used to signal the n-th scalability dimension according to FIG. 13 beginning at the MSB for n=0 or the end of the (n−1)-th signaled scalability dimension for n>0.

TABLE 4

Proposed sealabITHtY. t:ype mappm2 table

| scalability_type | max_dim | dimensions |
|---|---|---|
| 0 | 1 | none |
| 1 | 2 | spatial and quality scalability |
| 2 | 2 | multiview and depth scalability |
| 3 | 4 | multiview, spatial, quality and depth scalability |
| 4-15 | reserved | reserved |

The scalability types exemplarily defined in Table 4 represent a set of scalabilities which can be anticipated at this point in time, but may be extended with new dimensions and/or combinations once the work on HEVC extensions progresses.

The corresponding VPS extension data syntax is shown in FIG. 14, where:

vps_extension_type indicates the type of the VPS extension. When the value of vps_extension_type is equal 0, the syntax given above applies.

layer_id_plus 1 indicates the layer_id for which the syntax elements signaled in the VPS extension are valid.

max_temporal_layers_minus1 plus 1 specifies the maximum number of temporal sub-layers that may be present in NAL units with a layer_id_plus1 equal to the layer_id_plus1 signaled in the VPS.

new_profile_level_flag equal to 0 indicates that the profile and level signaling associated with a value of layer_id_plus 1 equal to the values specified by profile_reference_layer_id_plus1 is valid for the NAL unit with layer_id_plus1 specific within the VPS extension. new_profile_level_flag equal to 1 indicates that profile and level for the specified value of layer_id_plus1 is signaled explicitly in the VPS extension.

profile_reference_layer_id_plus1 indicates the value of layer_id_plus1 whose associated profile and level signaling is valid for NAL units with a value of layer_id_plus1 equal to the value of layer_id_plus1 signaled in the VPS extension.

profile_space, profile_idc, constraint_flags, and profile_compatability_flag signal information as specified in the current WD and the indicated values are valid for all NAL units with a layer_id_plus1 equal to the layer_id_plus1 values specified in the VPS extension data.

level_idc[i] signals information as specified in the current WD and the indicated values are values for all NAL units with a layer_id_plus1 equal to layer_id_plus1 values specified in the VPS extension data and a temporal_id equal to i.

num_reference_layers specifies the number of layers, identified by layer_id, to be used as references in the decoding process.

direct_coding_dependency_layer_id_plus1 indicates the layer_id_plus1 of NAL units to be used as references in the decoding process.

The embodiment just described is very similar to the one having been described with respect to FIGS. 4 to 6. Insofar, the same reference signs as before have been used in order to identify corresponding syntax elements in FIGS. 11 to 14. Insofar, the description of FIG. 7 is applicable to the new embodiment as well, wherein however differences are highlighted below.

In particular, in accordance with the embodiments of FIGS. 11 to 14 the operation point identifier 34 has been fixedly split-up into two components, namely a first component identifying the rank in a temporal scalability axis in the form of syntax element temporal_id 90, and a second component treating the rank or ranks according to the further scalability axis, with the second component being denoted 92. Insofar, the embodiment having been described with respect to FIGS. 11 to 14 corresponds to the previous embodiment except that it has the second component 92, which is further specified by the scalability axes descriptor.

A next difference pertains to the knowledge of the number of scalability axes. In the embodiment of FIGS. 4 to 6, an intermediate information in the form of the scenario syntax element 60 was provided in order to provide network entities with the opportunity to derive, solely based on the individual packet itself, where the operation point of this packet is, in an ordinary sense, positioned within the scalability space. In the present embodiment, a network entity is merely able to derive the following facts in case of the non-availability of a VPS NAL unit 42: 1) the position of the operation point of the current packet along the temporal axis using temporal_id 90. 2) If layer_id_plus1 is equal to 1, the operation point is at the lower most rank with respect to all other scalability axes except the temporal scalability axis.

As described hereinafter, all differences now highlighted may be applied individually and accordingly, if the syntax element temporal_id 90 is not used, a network entity may derive from the fact that layer_id_plus1 equals 1, that the operation point of the current packet denotes the base layer in accordance with all scalability axes.

In this regard, it should be noted that choosing layer_id_plus1 equaling 1 as denoting the lower most rank with respect to the other scalability axes except the temporal one, has merely been chosen as an example and may be varied, such as for example to layer_id_plus1 equaling 0.

A further difference to the above-outlined embodiment of FIGS. 4 to 6 relates to the scalability axes descriptor 38. One scalar valued syntax element 94, namely scalability_type, identifies the number of scalability axes (above the temporal one) and the corresponding meanings of these (additional) scalability axes, while for each of this indicated number of (additional) scalability axes, a syntax portion 96 reveals the partitioning of the fixed-length-syntax element 60 underlying component 92, field 56 and reference field 52 by sequentially assigning bits of this fixed-length-syntax element 60 the individual (additional) scalability axes.

A further difference relates to the VPS packets and the fact that same additionally comprise operation point identifier reference lists 98. For each field 56, such an operation point identifier reference list 98 identifies those operation point identifiers or those values of layer_id_plus 1, which form the necessitated basis for a reconstruction of the operation point which field 56 relates to. In other words, the operation point identifier reference list 98 identifies all operation points contained in a combination 24 (see FIG. 1b or 3) resulting from adding the data of packets of the operation point identified by field 56. It should be noted that for a certain field 56 the operation point identifier reference list 98 does not necessarily have to list all operation points included in the respective combination 24 of the operation point identified by field 56. Rather, it would suffice if the operation point identifier reference list lists one or more of reference operation points, the corresponding combinations 24 of which together result in the combination 24 of the operation point identified by the respective field 56.

In other words, in this aspect which is advantageous for its efficient coding of the level and/or profile constraints imposed onto the scalability layers, a data stream into which a media content is coded, comprises packets (c.p. NAL units), each packet comprising an packet type identifier nal_unit_type identifying a packet type associated with the respective packet, out of a plurality of packet types, wherein each packet having a packet type out of a first set of the plurality of packet types associated therewith (e.g. all NAL units), comprises an operation point identifier layer_id_plus1 identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith (e.g. non-VPS NAL units), additionally carries data contributing to a coded representation of the media content at the operation point associated with the respective packet along with the packets having any operation point associated therewith which precedes the operation point associated with the respective packet, or equals the operation point associated with the respective packet, wherein each packet (c.p. VPS NAL units) having a predetermined packet type disjoint to (i.e. external to) the second set associated therewith, has an scalability axes descriptor (c.p. scalability_type and layer_id_plus1_dim_len) defining the number of the one or more scalability axes and a semantic meaning thereof.

Another example of the data stream, wherein each of the packets having the predetermined packet type associated therewith, also comprises a sequence of profile and/or level descriptors vps_extension_data individually associated with at least a subset (e.g. the leading ones, in terms of the sequential operation point order) of the plurality of operation points, each profile and/or level descriptor defining an available coding option set (c.p. profile) and/or an available syntax element value range (c.p. level) which a syntax of packets having the operation point associated with the respective profile and/or level descriptor, associated therewith, obey, wherein a first set of the profile and/or level descriptors explicitly signal the definition of the available coding option set and/or available syntax element value range, (c.p. new_profile_level_flag=1) and a second, disjoint non-empty set of the profile and/or level descriptors signal the definition of the available coding option set and/or available syntax element value range by referencing another, preceding profile and/or level descriptor (c.p. new_profile_level_flag=0).

In another example of the data stream, the sequence of profile and/or level descriptors is sequentially associated, in the sequential operation point order, with the at least subset (e.g. the leading ones, in terms of the sequential operation point order) of the plurality of operation points.

In another example of the data stream, each profile and/or level descriptor has a field (c.p. layer_id_plus1) identifying the operation point the respective profile and/or level descriptor is associated with (i.e. along with 4), the sequential operation point order is derivable from the sequence of profile and/or level descriptors.

In another example of the data stream, in each profile and/or level descriptor, the field identifies the operation point the respective profile and/or level descriptor is associated with, using a bitsequence common to the operation point identifiers identifying the operation point the respective profile and/or level descriptor is associated with.

In another example of the data stream, all operation point identifiers have a fixed-bit-length syntax element (c.p. layer_id_plus1), and the scalability access descriptor signals n max_dim and an association of n partitions layer_id_plus1_dim_len of the fixed-bit-length syntax element with the n scalability axes, wherein the bitsequence is common to the fixed-bit-length syntax element.

In another example of the datastream, the second, disjoint non-empty set of the profile and/or level descriptors signal the definition of the available coding option set and/or available syntax element value range by referencing another, preceding profile and/or level descriptor using an explicit signaling of the field of the referenced profile and/or level descriptor, or using a relative pointer defined in units of ranking positions in the sequential operation point order (with the second alternative being an alternative to above description).

According to a further aspect of the datastream, all operation point identifiers have a fixed-bit-length syntax element, and the scalability axes descriptor signals n and an association of n partitions of the fixed-bit-length syntax element with the n scalability axes so that the n-th portion is a ordinal measure of a position of the respective operation point along the n-th scalability axis.

According to another aspect, of the datastream, the scalability axes descriptor (c.p. scalability_type) comprises a syntax element the possible states of which are individually associated with different combinations of values for n and semantic meaning of the corresponding semantic meaning of the n scalability axes (i.e. a function maps {n,meaning(1), . . . , meaning(n)} to {1 . . . max. possible state of scalability_type}).

In another datastream into which a media content is coded, the datastream comprises packets, each packet comprising an packet type identifier identifying a packet type associated with the respective packet, out of a plurality of packet types, wherein each packet having a packet type out of a first set of the plurality of packet types associated therewith, comprises an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or is equals the operation point associated with the respective packet, wherein each packet having a predetermined packet type disjoint to (external to) the second set associated therewith, comprises a sequence of profile and/or level descriptors individually associated with at least a subset (e.g. the leading ones, in terms of the sequential operation point order) of the plurality of operation points, each profile and/or level descriptor defining an available coding option set and/or an available syntax element value range which a sequence of packets having the operation point associated with the respective profile and/or level descriptor, associated therewith, obey, wherein a first set of the profile and/or level descriptors explicitly signal the definition of the available coding option set and/or available syntax element value range, and a second, disjoint non-empty set of the profile and/or level descriptors signal the definition of the available coding option set and/or available syntax element value range by referencing another, preceding profile and/or level descriptor.

In another example of the datastream, the sequence of profile and/or level descriptors is sequentially associated, in the sequential operation point order, with the at least subset (e.g. the leading ones, in terms of the sequential operation point order) of the plurality of operation points.

In another example of the datastream, each profile and/or level descriptor has a field identifying the operation point the respective profile and/or level descriptor is associated with.

In another example of the datastream, in each profile and/or level descriptor, the field identifies the operation point the respective profile and/or level descriptor is associated with, using a bitsequence common to the operation point identifiers identifying the operation point the respective profile and/or level descriptor is associated with.

In another example of the datastream, all operation point identifiers have a fixed-bit-length syntax element and the scalability access descriptor signals n max_dim and an association of n partitions layer_id_plus1_dim_len) of the fixed-bit-length syntax element with then scalability axes, wherein the bitsequence is common to the fixed-bit-length syntax element.

In another example of the datastream, the second, disjoint non-empty set of the profile and/or level descriptors signal the definition of the available coding option set and/or available syntax element value range by referencing another, preceding profile and/or level descriptor using an explicit signaling of the field of the referenced profile and/or level descriptor, or using a relative pointer defined in units of ranking positions in the sequential operation point order.

In another example of the datastream, all operation point identifiers have a flag signaling as to whether same belongs to the first set of the profile and/or level descriptors explicitly signaling the definition of the available coding option set and/or available syntax element value range, and the second, disjoint non-empty set of the profile and/or level descriptors signaling the definition of the available coding option set and/or available syntax element value range by referencing another, preceding profile and/or level descriptor.

Another aspect may have a network entity (e.g., decoder or MANE) for processing a datastream into which a media content is coded, the datastream comprising packets, each packet comprising an packet type identifier identifying a packet type associated with the respective packet, out of a plurality of packet types, wherein each packet having a packet type out of a first set of the plurality of packet types associated therewith, comprises an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or equals the operation point associated with the respective packet, wherein the network entity is configured to read from a packet having a predetermined packet type disjoint to (i.e. external to) the second set associated therewith, a scalability axes descriptor defining the number of the one or more scalability axes and a semantic meaning thereof, and interpret the operation point identifiers depending on the scalability axes descriptor.

In another example, the network entity is configured to read from the packet having the predetermined packet type disjoint to (external to) the second set associated therewith, a sequence of profile and/or level descriptors individually associated with at least a subset (e.g. the leading ones, in terms of the sequential operation point order) of the plurality of operation points, each profile and/or level descriptor defining an available coding option set and/or an available syntax element value range which a syntax of packets having the operation point associated with the respective profile and/or level descriptor, associated therewith, obey, wherein the network entity is configure to, responsive to a signaling in the datastream, explicitly read from a first set of the profile and/or level descriptors the definition of the available coding option set and/or available syntax element value range, and read, for a second, disjoint non-empty set of the profile and/or level descriptors, a reference to another, preceding profile and/or level descriptor and derive the definition of the available coding option set and/or available syntax element value range of the second, disjoint non-empty set of the profile and/or level descriptors from the respective referenced preceding profile and/or level descriptor.

In another example of the network entity, the sequence of profile and/or level descriptors is sequentially associated, in the sequential operation point order, with the at least subset (e.g. the leading ones, in terms of the sequential operation point order) of the plurality of operation points.

In another example of the network entity, each profile and/or level descriptor has a field identifying the operation point the respective profile and/or level descriptor is associated with.

In another example of the network entity, in each profile and/or level descriptor, the field identifies the operation point the respective profile and/or level descriptor is associated with, using a bitsequence common to the operation point identifiers identifying the operation point the respective profile and/or level descriptor is associated with.

In another example of the network entity, all operation point identifiers have a fixed-bit-length syntax element and the scalability access descriptor signals n max_dim and an association of n partitions layer_id_plus1_dim_len of the fixed-bit-length syntax element with then scalability axes, wherein the bitsequence is common to the fixed-bit-length syntax element.

In another example of the network entity, the second, disjoint non-empty set of the profile and/or level descriptors signal the definition of the available coding option set and/or available syntax element value range by referencing another, preceding profile and/or level descriptor using an explicit signaling of the field of the referenced profile and/or level descriptor, or using a relative pointer defined in units of ranking positions in the sequential operation point order.

In another example of the network entity, all operation point identifiers have a fixed-bit-length syntax element and the scalability access descriptor signals n max_dim and an association of n partitions layer_id_plus1_dim_len of the fixed-bit-length syntax element with the n scalability axes so that the n-th portion is a ordinal measure of a position of the respective operation point along then-th scalability axis.

In another example, network entity is configured to render a selection among the packets having any packet type out of the first set of the plurality of packet types associated therewith based on the interpretation.

Another example may have a network entity (e.g., decoder or MANE) for processing a datastream into which a media content is coded, the datastream comprising packets, each packet comprising an packet type identifier identifying a packet type associated with the respective packet, out of a plurality of packet types, wherein each packet having a packet type out of a first set of the plurality of packet types associated therewith, comprises an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or is equals the operation point associated with the respective packet, wherein the network entity is configured to read from a packet having a predetermined packet type disjoint to (external to) the second set associated therewith, a sequence of profile and/or level descriptors sequentially associated, in the sequential operation point order, with at least a subset (the leading ones, in terms of the sequential operation point order) of the plurality of operation points, each profile and/or level descriptor defining an available coding option set and/or an available syntax element value range which a syntax of packets having the operation point associated with the respective profile and/or level descriptor, associated therewith, obey, wherein the network entity is configure to, responsive to a signaling in the datastream, explicitly read from a first set of the profile and/or level descriptors the definition of the available coding option set and/or available syntax element value range, and read, for a second, disjoint non-empty set of the profile and/or level descriptors, a reference to another, preceding profile and/or level descriptor and derive the definition of the available coding option set and/or available syntax element value range of the second, disjoint non-empty set of the profile and/or level descriptors from the respective referenced preceding profile and/or level descriptor.

In another example, the network entity is configured to render a selection among the packets having any packet type out of the first set of the plurality of packet types associated therewith based on the associated available coding option set and/or an available syntax element value range.

The following deviations from above embodiments would be feasible. For example, instead of having one profile/level descriptor for exactly one operation point or layer ID, an grouping of the operation points or layer IDs into layer sets could be signaled in the data stream such as in the VPS, with associating each profile/level descriptor to a respective one of the sets. For example, a field of flags could be signaled to signal the grouping: for each set, one flag for each operation point could be present for signaling as to whether the respective operation point belongs to the respective set or not. Thus, rather than having field 56 citing any layer ID, the profile/level descriptor's filed 56 could index a set out of the signaled sets of layer IDs, i.e. out of the sets of operation points. Accordingly, the referencing of another profile/level descriptor would be done via signaling another layer set in field 52 rather than signaling an individual layer ID therein.

Further, with regard to the scalability axes descriptor 38, same could be signaled differently: a scalability type field composed of a sequence of flags, each associated with a certain scalability type, could by present in the data stream in the VPS, for example, and signal as to whether the respective scalability type is present or not. In the order the flags within this field, the flags being set would thus signal the number of scalability axes as well as the semantic meaning thereof. The subdivision of the layer ID field's 34 bit sequence into the fragments 62 could be done using a length indicator per scalability type, i.e. per flag set in the scalability type field, just as done by layer_id_plus 1_dim_len. Together, scalability type field and layer_id_plus1_dim_len would form the scalability axes descriptor 38.

Above, a pair of a list 98 of reference operation point identifiers and a field 56 identifying the operation point (or set of operation points) the list 98 of reference operation point identifiers is associated with, was used to indicate the sequential operation point order, i.e the dependency among the layers. This was one possibility to allow for operation points to depend on more than one predecessor of the operation points along their order of operation point identifiers. In a use case with multiple camera views, for example, signalling of multiple reference views (i.e. multiple values of nuh_layer_id) per coded view (i.e. an individual value of nuh_layer_id) is beneficial as occlusions and revelation of corresponding image areas in neighboring camera views may occur depending on the translation of cameras with respect to each other. Therefore, referencing multiple camera views can lead to a higher coding efficiency as revealed image areas (i.e. texture) may be predicted instead of intra-coded from either of the referenced camera views. Coding benefits are not limited to references within the same scalability dimension, e.g. a depth view (related to the currently coded camera view or another camera view) could be utilized to predict motion vectors for the currently coded dependent camera view. However, signaling which allows for one operation point to be dependent on more than one operation point having lower operation point identifier associated therewith, could also be implemented differently. For example, for each operation point, flags could signal as to which of the operation points preceding in layer ID, i.e. having a lower operation point identifier, the respective operation point depends on. The field could be signaled in a condensed form: the N operation points occurring in the bit stream have an order defined thereamong which is defined by their operation point identifier. The sequence of operation points may, thus, scanned from the second but lowest one in operation point identifier sense to the highest one, with inserting one flag per operation point with lower operation point identifier into the VPS, thereby needing N(N−1)/2 bits. That is, for each of the plurality of operation points—or at least a subset thereof-, a syntax, such as the reference layer ID list 98 or the sequence of flags concerning the operation point predecessors—identifying other operation points of the plurality of operation points, identified by lower operation point identifiers, may be present in the VPS, with these identified operation point identifiers forming the basis of the respective operation point: In other words, the syntax identifies those operation points, the respective operation point the syntax belongs to, is an extension of, thereby indicating the sequential operation point order.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Thomas Wiegand, Gary J. Sullivan, Gisle Bjontegaard, Ajay Luthra, "Overview of the H.264/AVC Video Coding Standard", IEEE Trans. Circuits Syst. Video Technol., vol. 13, N7, July 2003.

[2] JCT-VC, "High-Efficiency Video Coding (HEVC) text specification Working Draft 6", JCTVC-H1003, February 2012.

[3] ISO/IEC 13818-1: MPEG-2 Systems specification.

What is claimed:

1. An apparatus comprising: a processor comprising hardware configured to:
   process a data stream including packets having encoded information related to a video, the data stream including:
      a sequence of flags each indicating whether an associated scalability type of a plurality of scalability types is present or not,
      a first syntax element identifying an operation point associated with a first packet of the packets, wherein each portion of different portions of the first syntax element is: (a) associated with a corresponding scalability type of the plurality of scalability types, and (b) a measure of a position of the operation point associated with the first packet along a dimension of the corresponding scalability type, and
      the first packet including data, which when parsed by a decoder, contribute to reconstruction of at least a portion of the video at the operation point associated with the first packet,
   obtain an operation point identifier associated with the first packet in accordance with the first syntax element, and
   decode the data of the first packet based on the operation point identifier to reconstruct at least a portion of the video.

2. The apparatus of claim 1, the data stream further including a second syntax element, which provides index information to determine association of each portion of the first syntax element with the corresponding scalability type.

3. The apparatus of claim 1, wherein the processor is configured to render a selection of the packets of the first packet type.

4. The apparatus of claim 1, wherein the first packet is of a first packet type, and the processor is configured to read, from a packet of a second packet type, a sequence of profile or level descriptors individually associated with at least a subset of a plurality of operation points, each profile or level descriptor defining an available coding option set or an available syntax element value range which a syntax of packets having the operation point associated with the respective profile or level descriptor, associated therewith, obey,
   wherein the processor is configured to,
   responsive to a signaling in the data stream, read from a first set of the profile or level descriptors the definition of the available coding option set or available syntax element value range, and
   read, for a second, disjoint non-empty set of the profile or level descriptors, a reference to another, profile or level descriptor and derive the definition of the available coding option set or available syntax element value range of the second, disjoint non-empty set of the profile or level descriptors from the respective referenced profile or level descriptor.

5. The apparatus of claim 4, wherein each profile or level descriptor comprises a field identifying the operation point the respective profile or level descriptor is associated with.

6. The apparatus of claim 5, wherein the second, disjoint non-empty set of the profile or level descriptors signal the definition of the available coding option set or available syntax element value range by referencing another profile or level descriptor using an explicit signaling of the field of the referenced profile or level descriptor.

7. The apparatus of claim 4, wherein the processor is configured to read, from the packets of the second packet type, also, for each of at least a subset of the plurality of operation points, a syntax identifying other operation points of the plurality of operation points, identified by lower operation point identifiers, which the respective operation point is an extension of, thereby indicating the sequential operation point order.

8. The apparatus of claim 7, wherein each field identifies the respective operation point using a bit-sequence common to the operation point identifiers identifying the respective operation point.

9. The apparatus of claim 2, wherein the first packet includes the first and second syntax elements, and the operation point identifier identifies the scalability type from the plurality of scalability types for the operation point associated with the first packet.

10. An encoder comprising:
a processor comprising hardware configured to:
encode, into a data stream, packets having information related to a video, a sequence of flags each indicating whether an associated scalability type of a plurality of scalability types is present or not, and a first syntax element identifying an operation point associated with a first packet of the packets, wherein:
each portion of different portions of the first syntax element is: (a) associated with a corresponding scalability type of the plurality of scalability types, and (b) a measure of a position of the operation point associated with the first packet along a dimension of the corresponding scalability type, and
the first packet including data, which when parsed by a decoder, contribute to reconstruction of at least a portion of the video at the operation point associated with the first packet,
wherein an operation point identifier associated with the first packet is obtained in accordance with the first syntax element.

11. The encoder of claim 10, the processor is configured to encode a second syntax element, which provides index information to determine association of each portion of the first syntax element with the corresponding scalability type.

12. The encoder of claim 10, wherein the first packet is of a first packet type, and the processor is configured to encode, into a packet of a second packet type, a sequence of profile or level descriptors individually associated with at least a subset of a plurality of operation points, each profile or level descriptor defining an available coding option set or an available syntax element value range which a syntax of packets having the operation point associated with the respective profile or level descriptor, associated therewith, obey.

13. The encoder of claim 10, wherein the first syntax element is of a fixed bit length.

14. A method, comprising:
encoding, into a data stream, packets having information related to a video, a sequence of flags each indicating whether an associated scalability type of a plurality of scalability types is present or not, and a first syntax element identifying an operation point associated with a first packet of the packets, wherein:
each portion of different portions of the first syntax element is: (a) associated with a corresponding scalability type of the plurality of scalability types, and (b) a measure of a position of the operation point associated with the first packet along a dimension of the corresponding scalability type, and
the first packet including data, which when parsed by a decoder, contribute to reconstruction of at least a portion of the video at the operation point associated with the first packet,
wherein an operation point identifier associated with the first packet is obtained in accordance with the first syntax element.

15. A method for transmitting a data stream into which packets having information related to a video are encoded according to the method of claim 14.

* * * * *